US012748300B2

(12) United States Patent
Matsushita et al.

(10) Patent No.: US 12,748,300 B2
(45) Date of Patent: Sep. 29, 2026

(54) OPTICAL MODULE, ELECTRONIC DEVICE, AND DRIVING METHOD

(71) Applicant: SEIKO EPSON CORPORATION, Tokyo (JP)

(72) Inventors: Tomonori Matsushita, Chino (JP); Nozomu Hirokubo, Fujimi (JP)

(73) Assignee: SEIKO EPSON CORPORATION (JP)

( * ) Notice: Subject to any disclaimer, the term of this patent is extended or adjusted under 35 U.S.C. 154(b) by 106 days.

(21) Appl. No.: 18/813,478

(22) Filed: Aug. 23, 2024

(65) Prior Publication Data

US 2024/0418981 A1 Dec. 19, 2024

Related U.S. Application Data

(63) Continuation of application No. 17/314,553, filed on May 7, 2021, now abandoned, which is a continuation (Continued)

(30) Foreign Application Priority Data

Sep. 12, 2012 (JP) ................................ 2012-200218

(51) Int. Cl.

*G02B 26/00* (2006.01)
*G01J 3/02* (2006.01)

(Continued)

(52) U.S. Cl.

CPC .......... *G02B 26/001* (2013.01); *G01J 3/0264* (2013.01); *G01J 3/027* (2013.01);

(Continued)

(58) Field of Classification Search

CPC ...... G02B 26/001; G01J 3/0264; G01J 3/027; G01J 3/0291; G01J 3/06; G01J 3/10;

(Continued)

(56) References Cited

U.S. PATENT DOCUMENTS 2,885,923 A 5/1959 Simmons
3,635,562 A 1/1972 Catherin (Continued)

FOREIGN PATENT DOCUMENTS

JP 01-094312 4/1989
JP 2001221913 A 8/2001

(Continued)

OTHER PUBLICATIONS

Hirabayashi et al.; "Tunable Liquid-Crystal Fabry-Perot Interferometer Filter for Wavelength-Division Multiplexing Communication Systems", Journal of Lightwave Technology, vol. 11, No. 12, Dec. 1993.*

(Continued)

*Primary Examiner* — Mohamed K Amara

(74) *Attorney, Agent, or Firm* — Harness, Dickey & Pierce, P.L.C.

(57) ABSTRACT

An optical module includes a wavelength variable interference filter having a fixed reflective film, a movable reflective film which faces the fixed reflective film with a gap between reflective films interposed therebetween, and an electrostatic actuator that changes the gap between reflective films, and a gap control unit that controls the electrostatic actuator. The gap control unit controls the electrostatic actuator on the basis of an order which is set in accordance with a wavelength to be measured, and changes the gap between the reflective films.

10 Claims, 12 Drawing Sheets

Related U.S. Application Data of application No. 16/788,602, filed on Feb. 12, 2020, now Pat. No. 11,029,509, which is a continuation of application No. 15/819,227, filed on Nov. 21, 2017, now abandoned, which is a continuation of application No. 14/025,050, filed on Sep. 12, 2013, now abandoned.

(51) Int. Cl.
*G01J 3/06* (2006.01)
*G01J 3/10* (2006.01)
*G01J 3/26* (2006.01)
*G01J 3/28* (2006.01)
*G01J 3/32* (2006.01)
*G01J 3/42* (2006.01)
*G01J 3/50* (2006.01)

(52) U.S. Cl.
CPC ............... *G01J 3/0291* (2013.01); *G01J 3/06* (2013.01); *G01J 3/10* (2013.01); *G01J 3/26* (2013.01); *G01J 3/28* (2013.01); *G01J 3/2823* (2013.01); *G01J 3/32* (2013.01); *G01J 3/42* (2013.01); *G01J 3/50* (2013.01)

(58) Field of Classification Search
CPC .... G01J 3/26; G01J 3/28; G01J 3/2823; G01J 3/32; G01J 3/42; G01J 3/50
See application file for complete search history.

(56) References Cited

U.S. PATENT DOCUMENTS 4,172,663 A 10/1979 Byer et al.
4,403,248 A 9/1983 Te Velde
4,822,998 A 4/1989 Yokota
4,825,262 A 4/1989 Mallinson
4,859,060 A 8/1989 Katagiri et al.
4,918,704 A 4/1990 Caprara et al.
4,979,821 A 12/1990 Schutt et al.
5,039,201 A 8/1991 Liu
5,142,414 A 8/1992 Koehler
5,170,221 A 12/1992 Matsui et al.
5,357,340 A 10/1994 Zochbauer
5,550,373 A 8/1996 Cole et al.
5,572,543 A 11/1996 Heinemann et al.
5,801,829 A 9/1998 Mueller et al.
5,891,656 A 4/1999 Zarling et al.
5,909,280 A 6/1999 Zavracky
5,923,420 A * 7/1999 Iwasaki .................... G01J 3/28 356/319
6,008,492 A 12/1999 Slater et al.
6,275,324 B1 8/2001 Sneh
6,321,003 B1 11/2001 Kner et al.
6,381,022 B1 4/2002 Zavracky
6,384,458 B1 5/2002 Bode et al.
6,407,376 B1 6/2002 Korn et al.
6,466,354 B1 10/2002 Gudeman
6,537,829 B1 3/2003 Zarling et al.
6,545,739 B1 4/2003 Matsumoto et al.
6,592,817 B1 7/2003 Tsai et al.
6,608,685 B2 8/2003 Wood et al.
6,614,568 B1 9/2003 Feuer
6,747,742 B1 6/2004 Verma
6,763,718 B1 7/2004 Waters et al.
6,791,261 B1 9/2004 Shimoda et al.
6,836,366 B1 12/2004 Flanders et al.
6,841,205 B1 1/2005 Sismondi et al.
6,844,975 B2 1/2005 Sargent et al.
7,015,457 B2 3/2006 Cole et al.
7,072,093 B2 7/2006 Piehl et al.
7,164,479 B2 1/2007 Johansen et al.
7,187,453 B2 3/2007 Belleville
7,212,292 B2 5/2007 Van Brocklin et al.
7,218,438 B2 5/2007 Przybyla et al.
7,221,497 B2 5/2007 Piehl et al.
7,294,280 B2 11/2007 Sherrer et al.
7,304,798 B2 12/2007 Izumi et al.
7,319,552 B2 1/2008 McKinnell et al.
7,340,127 B1 3/2008 Chang et al.
7,355,714 B2 4/2008 Wang et al.
7,432,508 B2 10/2008 Daniels et al.
7,447,891 B2 11/2008 Faase et al.
7,554,711 B2 6/2009 Miles
7,583,418 B2 9/2009 Mestha et al.
7,623,278 B2 11/2009 Mestha et al.
7,653,371 B2 1/2010 Floyd
7,773,222 B2 8/2010 Mestha
7,911,623 B2 3/2011 Lin et al.
7,970,041 B2 6/2011 Arimoto et al.
7,982,700 B2 7/2011 Chui et al.
8,008,736 B2 8/2011 Kothari
8,035,883 B2 10/2011 Kothari
8,203,769 B2 6/2012 Herloski et al.
8,210,690 B2 7/2012 Gulvin et al.
8,259,300 B2 9/2012 Arnvidarson
8,282,544 B2 10/2012 Kamihara
8,346,085 B2 1/2013 Vogel
8,368,997 B2 2/2013 Endisch et al.
8,687,254 B2 4/2014 Hanamura et al.
8,792,100 B2 7/2014 Saari et al.
8,797,632 B2 8/2014 Hong et al.
8,817,357 B2 8/2014 Tao et al.
8,963,159 B2 2/2015 Lee et al.
8,970,939 B2 3/2015 Chui et al.
8,971,675 B2 3/2015 Lasiter
9,110,200 B2 8/2015 Nichol et al.
9,128,279 B2 9/2015 Sano
9,132,681 B2 9/2015 Arnabat Benedicto et al.
9,134,527 B2 9/2015 Lee et al.
9,291,502 B2 3/2016 Nishimura
9,307,938 B2 4/2016 Martini et al.
9,389,350 B2 7/2016 Hirokubo
9,429,474 B2 8/2016 Sabry et al.
9,466,628 B2 10/2016 Gonzalez et al.
9,664,563 B2 5/2017 Lucey
9,753,199 B2 9/2017 Nishimura et al.
9,835,492 B2 12/2017 Nishimura
10,670,856 B2 6/2020 Kuri
11,156,500 B2 10/2021 Kasahara et al.
2001/0055119 A1 12/2001 Wood et al.
2002/0076147 A1 6/2002 Cush et al.
2002/0126726 A1 9/2002 Flanders et al.
2002/0146190 A1 10/2002 Doi et al.
2003/0002809 A1 1/2003 Jian
2003/0016354 A1 1/2003 Hui
2003/0123125 A1 7/2003 Little
2003/0132386 A1 7/2003 Carr et al.
2003/0169420 A1* 9/2003 Ruiz ......................... G01J 3/28 356/307
2003/0203490 A1 10/2003 Vuong
2003/0231844 A1 12/2003 Kersey et al.
2004/0021970 A1 2/2004 Kondo et al.
2004/0100678 A1 5/2004 Chang et al.
2004/0218251 A1 11/2004 Piehl et al.
2005/0051729 A1* 3/2005 Chrisp .................. G01J 3/0256 250/339.07
2005/0134962 A1 6/2005 Verghese
2005/0237538 A1 10/2005 Belleville
2006/0017689 A1 1/2006 Faase et al.
2006/0017934 A1 1/2006 Van Brocklin et al.
2006/0018348 A1 1/2006 Przybyla et al.
2006/0038994 A1* 2/2006 Chrisp ...................... G01J 3/18 356/328
2006/0082863 A1 4/2006 Piehl et al.
2006/0132787 A1 6/2006 Mestha et al.
2006/0165346 A1 7/2006 Sahlgren et al.
2006/0221346 A1 10/2006 Mestha et al.
2006/0223172 A1 10/2006 Bedingham et al.
2006/0244975 A1 11/2006 VanBrocklin et al.
2007/0024672 A1 2/2007 Hano et al.
2007/0064295 A1 3/2007 Faase et al.
2007/0153287 A1 7/2007 Lin et al.

(56) References Cited

U.S. PATENT DOCUMENTS

| | | | |
|---|---|---|---|
| 2007/0153288 | A1 | 7/2007 | Wang et al. |
| 2007/0159638 | A1 | 7/2007 | Zeng et al. |
| 2007/0171531 | A1 | 7/2007 | Nakamura |
| 2007/0183781 | A1 | 8/2007 | Zeng |
| 2008/0062426 | A1 | 3/2008 | Yoshida |
| 2008/0080026 | A1 | 4/2008 | Mestha et al. |
| 2008/0080027 | A1 | 4/2008 | Mestha et al. |
| 2008/0100827 | A1 | 5/2008 | Chang et al. |
| 2008/0186566 | A1 | 8/2008 | Johansen et al. |
| 2008/0239494 | A1 | 10/2008 | Zander |
| 2008/0252897 | A1 | 10/2008 | Arnvidarson et al. |
| 2008/0273208 | A1 | 11/2008 | Johansen et al. |
| 2008/0309921 | A1 | 12/2008 | Faase et al. |
| 2009/0122381 | A1 | 5/2009 | Owa et al. |
| 2009/0233061 | A1 | 9/2009 | Irita |
| 2010/0004511 | A1 | 1/2010 | Kamihara |
| 2010/0027096 | A1 | 2/2010 | Pan |
| 2010/0143730 | A1 | 6/2010 | Tai |
| 2010/0220331 | A1 | 9/2010 | Zribi et al. |
| 2010/0245832 | A1 | 9/2010 | Saari |
| 2010/0292581 | A1 | 11/2010 | Howard et al. |
| 2011/0007311 | A1 | 1/2011 | Correns |
| 2011/0026022 | A1 | 2/2011 | Takizawa et al. |
| 2011/0075142 | A1 | 3/2011 | Maity et al. |
| 2011/0176128 | A1 | 7/2011 | Matsuno |
| 2011/0222157 | A1 | 9/2011 | Sano |
| 2012/0013905 | A1 | 1/2012 | Nozawa |
| 2012/0044491 | A1 | 2/2012 | Urushidani et al. |
| 2012/0045618 | A1 | 2/2012 | Yamazaki |
| 2012/0050869 | A1 | 3/2012 | Nishimura et al. |
| 2012/0120403 | A1 | 5/2012 | Funamoto |
| 2012/0128949 | A1 | 5/2012 | Goto |
| 2012/0133947 | A1 | 5/2012 | Nozawa |
| 2012/0188552 | A1 | 7/2012 | Hirokubo |
| 2012/0188646 | A1 | 7/2012 | Sano et al. |
| 2012/0200926 | A1 | 8/2012 | Matsushita |
| 2012/0206813 | A1 | 8/2012 | Bahat et al. |
| 2012/0257280 | A1 | 10/2012 | Sano et al. |
| 2012/0287438 | A1 | 11/2012 | Nishimura et al. |
| 2012/0314295 | A1 | 12/2012 | Fukuyo et al. |
| 2013/0070247 | A1 | 3/2013 | Funamoto |
| 2013/0128338 | A1 | 5/2013 | Lin et al. |
| 2013/0258333 | A1 | 10/2013 | Chalmers et al. |
| 2013/0308134 | A1 | 11/2013 | Hirokubo |
| 2014/0071445 | A1 | 3/2014 | Matsushita et al. |
| 2014/0071451 | A1 | 3/2014 | Juuti et al. |
| 2014/0092478 | A1 | 4/2014 | Shinto |
| 2014/0092479 | A1 | 4/2014 | Nishimura et al. |
| 2014/0127485 | A1 | 5/2014 | Uto et al. |
| 2014/0198388 | A1 | 7/2014 | Reed et al. |
| 2014/0211315 | A1 | 7/2014 | Matsushita |
| 2014/0240508 | A1 | 8/2014 | Gomi |
| 2014/0240835 | A1 | 8/2014 | Sakashita et al. |
| 2014/0240837 | A1 | 8/2014 | Nishimura |
| 2014/0253924 | A1 | 9/2014 | Sano |
| 2014/0320854 | A1 | 10/2014 | Matsushita et al. |
| 2015/0021480 | A1* | 1/2015 | Chrisp .................... G01J 3/021 250/339.05 |
| 2015/0029590 | A1 | 1/2015 | Hirokubo |
| 2015/0043001 | A1* | 2/2015 | Ishimaru ............ A61B 5/14532 600/316 |
| 2015/0092194 | A1 | 4/2015 | Waldmann et al. |
| 2015/0138640 | A1 | 5/2015 | Matsushita |
| 2015/0300948 | A1 | 10/2015 | Buchtal et al. |
| 2015/0340838 | A1 | 11/2015 | Moriya et al. |
| 2015/0351208 | A1 | 12/2015 | Suganuma et al. |
| 2016/0123808 | A1 | 5/2016 | Obermueller |
| 2016/0370573 | A1 | 12/2016 | Shibayama et al. |
| 2017/0010153 | A1 | 1/2017 | Vezard et al. |
| 2017/0146401 | A1 | 5/2017 | Antila |
| 2017/0163901 | A1 | 6/2017 | Lin et al. |
| 2017/0195586 | A1 | 7/2017 | Borremans et al. |
| 2018/0003558 | A1 | 1/2018 | Goldring et al. |
| 2018/0284422 | A1 | 10/2018 | Kuri |
| 2018/0292267 | A1 | 10/2018 | Hirose et al. |
| 2019/0265103 | A1 | 8/2019 | Hirokubo |
| 2020/0183146 | A1 | 6/2020 | Matsushita et al. |
| 2020/0240838 | A1* | 7/2020 | Kim .......................... G01J 3/10 |

FOREIGN PATENT DOCUMENTS

| | | | |
|---|---|---|---|
| JP | 2004-334201 | A | 11/2004 |
| JP | 2005338534 | A | 12/2005 |
| JP | 2009-523248 | A | 6/2009 |
| JP | 2009134028 | A | 6/2009 |
| JP | 2012-127917 | A | 7/2012 |
| WO | 2007022326 | A2 | 2/2007 |

OTHER PUBLICATIONS

Milne et al. "Widely Tunable MEMS-Based Fabry-Perot Filter"; Journalofmicroelectromechanicalsystems, vol. 18, No. 4,Aug. 200.*

Extended European Search Report for Application No. EP 13 18 3692 dated Dec. 5, 2013 (8 pages).

https://en.wikipedia.org/wiki/Piezoelectricity.

http://en.wikipedia.org/wiki/Fabry-Perot_interferometer.

Lipson, S. G. wt al.. (1995), Optical Physics (3rd ed.), London: Cambridge U.P. p. 248. ISBN 0-521-06926-2.

* cited by examiner

OPTICAL MODULE, ELECTRONIC DEVICE, AND DRIVING METHOD

CROSS-REFERENCE TO RELATED APPLICATIONS

This application is a continuation of U.S. patent application Ser. No. 17/314,553 filed May 7, 2021, which is a continuation of U.S. patent application Ser. No. 16/788,602 filed Feb. 12, 2020, now U.S. Pat. No. 11,029,509 issued Jun. 8, 2021, which is a continuation of U.S. patent application Ser. No. 15/819,227 filed Nov. 21, 2017, now abandoned, which is a continuation of U.S. patent application Ser. No. 14/025,050, filed Sep. 12, 2013, now abandoned, which claims priority to Japanese Patent Application No. 2012-200218, filed Sep. 12, 2012, all of which are hereby expressly incorporated by reference herein in their entireties.

BACKGROUND

1. Technical Field

The present invention relates to an optical module including a wavelength variable interference filter, an electronic device, and a driving method.

2. Related Art

Hitherto, devices that measure a spectrum using a wavelength variable interference filter have been known (see, for example, JP-A-1-94312).

The device disclosed in JP-A-1-94312 is a variable interferometer (optical module)) including a Fabry-Perot interference portion (wavelength variable interference filter) which causes substrates having a reflective film provided to face each other, and in which a piezoelectric element is provided between the substrates, and a control circuit which applies a voltage to the piezoelectric element. In this optical module, an interval between the substrates is changed by applying a voltage to the piezoelectric element, and the wavelength of light passing through the wavelength variable interference filter is changed.

Incidentally, in JP-A-1-94312 mentioned above, an order m of a peak wavelength of the wavelength variable interference filter is set to the same value (m=1) in a wavelength region to be measured, and light of each wavelength is extracted.

However, when the order m is fixed to a lower order, there is a problem in that the gap between reflective films is excessively reduced depending on a wavelength to be measured. For example, when light of a target wavelength of 400 nm is extracted using a secondary peak of the wavelength variable interference filter, the gap between reflective films may be set to 340 nm, but in order to extract the light of the target wavelength of 400 nm using a primary peak, the gap between reflective films is required to be narrowed up to 140 nm. In this case, for example, when foreign substances or the like having a size of more than a targeted gap are present between the reflective films, foreign substances are interposed between the reflective films, and the wavelength variable interference filter causes malfunction, which leads to a problem of light of a target wavelength being not extracted.

SUMMARY

An advantage of some aspects of the invention is to provide an optical module, an electronic device, and a driving method which are capable of suppressing malfunction due to foreign substances, and improving the accuracy of gap control.

An aspect of the invention is directed to an optical module including: a first reflective film that transmits a portion of incident light and reflects a portion thereof; a second reflective film, disposed so as to face the first reflective film, which reflects a portion of incident light and transmits a portion thereof; a gap change unit that changes a size of a gap between the first reflective film and the second reflective film; and a gap control unit that controls the gap change portion, wherein the gap control unit controls the gap change portion on the basis of a wavelength to be measured and an order of a spectrum which is set with respect to each of two or more wavelength regions.

In the aspect of the invention, light of a peak wavelength of an order according to the wavelength to be measured is acquired in light extracted by the first reflective film and the second reflective film. That is, when light is caused to be incident on a Fabry-Perot etalon constituted by the first reflective film and the second reflective film facing each other, light of a predetermined wavelength based on the following Expression (1) is extracted.

$$m\lambda = 2nd\cos\theta \tag{1}$$

In the above Expression (1), λ is the wavelength of extracted light, θ is the incidence angle of incident light, n is the refractive index of a medium between the first reflective film and the second reflective film, d is the distance (gap) between the first reflective film and the second reflective film, and m is the order, and is equivalent to the order of a spectrum of the aspect of the invention. Meanwhile, in reality, the wavelength λ of light extracted by the first reflective film and the second reflective film may deviate slightly from Expression (1) due to the thickness or optical characteristics of the first reflective film and the second reflective film, and factors of a substrate or the like that supports the first reflective film and the second reflective film.

As shown in Expression (1), the light extracted by the first reflective film and the second reflective film becomes a spectrum having a plurality of peak wavelengths corresponding to the order m (m=1, 2, 3, 4 . . . ).

Here, in the aspect of the invention, the gap control unit sets the gap (that is, d in Expression (1)) between the first reflective film and the second reflective film on the basis of the order m which is set for each of two or more wavelength regions.

For example, when the order m=2 is set with respect to the wavelength region of 400 nm to 600 nm, and the order m=1 is set with respect to the wavelength region of 620 nm to 700, the gap control unit controls the gap change portion at the time of extracting light of 400 nm as the wavelength to be measured, and controls the gap to the gap d=340 nm capable of extracting the light of 400 nm using a secondary peak wavelength. In addition, the gap control unit controls the gap change portion at the time of extracting light of 700 nm as the wavelength to be measured, and controls the gap to the gap d=296 nm capable of extracting the light of 700 nm using a primary peak wavelength.

In such an aspect of the invention, in order to extract the light of the wavelength to be measured using a peak wavelength of an order according to the wavelength to be measured, for example, when light of a short wavelength is extracted, the order is set to be high and the light of the short wavelength is extracted using a higher-order peak wavelength. Therefore, it is possible to increase the gap between the first reflective film and the second reflective film, and to reduce the disadvantage of light of a desired wavelength being not extracted due to the interposition of foreign substances between the reflective films.

On the other hand, when the order is fixed to a higher order, the amount of the change of the gap between the reflective films with respect to the wavelength region to be measured is increased. For example, when the light of each wavelength of the wavelength region to be measured of 400 nm to 700 nm is sequentially extracted using a primary peak of the wavelength variable interference filter, the gap between reflective films may be changed between 140 nm and 295 nm. On the other hand, when the light of each wavelength of the wavelength region to be measured is sequentially extracted using a secondary peak of the wavelength variable interference filter, the gap between reflective films is required to be changed between 340 nm and 645 nm, which leads to the driving amount appropriately two times a case where the primary peak is used. In this manner, when the gap driving amount increases, it is difficult to control the gap using the gap change portion, and the accuracy of the gap control deteriorates. Therefore, for example, when measurement such as a spectrum analysis is performed on the basis of the extracted light, there is a problem in that the accuracy of measurement also deteriorates.

On the other hand, in the aspect of the invention, when there is a low risk of foreign substances being interposed at the time of extracting light using a lower-order peak wavelength, the order m may be set to be low. Therefore, for example, as compared to a case where only a higher order is used, it is possible to suppress an increase in the gap driving amount of the gap change portion, and to improve the accuracy of the gap control of the gap change portion.

As mentioned above, in the aspect of the invention, it is possible to enhance both the malfunction due to an excessive reduction in the gap and a deterioration in the accuracy of the gap control in the gap change portion when a higher-order peak wavelength is used.

In the optical module of the aspect of the invention, it is preferable that the gap change portion changes the size of the gap by applying a voltage, the gap control unit includes a storage unit that stores V-λ data in which a voltage applied to the gap change portion with respect to a wavelength to be measured is recorded for each wavelength to be measured, the V-λ data is data in which the wavelength to be measured is associated with a voltage corresponding to the gap for extracting light of the wavelength to be measured as a peak wavelength of the set order, and the gap control unit applies the voltage, corresponding to the wavelength to be measured, from the V-λ data to the gap change portion.

With this configuration, the gap control unit applies a voltage corresponding to the wavelength to be measured to the gap change portion on the basis of the V-λ data, and thus the configuration and process can be simplified.

In the optical module of the aspect of the invention, it is preferable that the gap change portion changes the size of the gap by applying a voltage, the gap control unit includes a storage unit that stores V-λ data in which a voltage applied to the gap change portion with respect to a wavelength to be measured is recorded for each wavelength to be measured, the V-λ data indicates a relationship between the wavelength to be measured and a voltage corresponding to the gap for extracting light of the wavelength to be measured as a peak wavelength of each order, and the gap control unit selects an order corresponding to the wavelength to be measured, and applies the voltage corresponding to the selected order to the gap change portion.

With this configuration, the gap control unit selects an order in accordance with the wavelength to be measured. Therefore, as the V-λ data, data in which a voltage value for each wavelength to be measured is recorded for each peak wavelength of the wavelength to be measured is used. In this case, it is possible to select a peak wavelength for extracting the wavelength to be measured using the gap control unit. Therefore, for example, even when a predetermined wavelength to be measured is set so as to be extracted as an initial setting using a primary peak wavelength, it is also possible to change an order for extracting the wavelength to be measured to a secondary peak wavelength. In this case, for example, when foreign substances are interposed between the reflective films at the time of controlling the gap corresponding to the predetermined wavelength to be measured, it is also possible to perform control so as to extract the wavelength to be measured using a higher-order peak wavelength. In addition, when it is difficult to control the gap due to an excessive reduction in the gap interval, it is possible to use a higher-order peak wavelength, and to thereby improve the accuracy of the gap control.

In the optical module of the aspect of the invention, it is preferable that a measurement wavelength region includes a first wavelength region and a second wavelength region having a longer wavelength than that of the first wavelength region, and the order which is set with respect to the wavelength to be measured belonging to the first wavelength region is higher than the order which is set with respect to the wavelength to be measured belonging to the second wavelength region.

That is, in this configuration, when the wavelength to be measured belonging to the first wavelength region located at the short wavelength side is extracted, the gap is controlled so as to extract the wavelength to be measured using a higher-order peak wavelength, and when the wavelength to be measured belonging to the second wavelength region located at the long wavelength side is extracted, the gap is controlled so as to extract the wavelength to be measured using a lower-order peak wavelength. In this manner, a higher order is used in the short wavelength region, and thus it is possible to increase the minimum value of the gap. That is, similarly to the aspect of the invention, it is possible to reduce the risk of foreign substances being interposed due to an excessive reduction in the gap. Further, a lower order is selected in the long wavelength region, and thus it is possible to reduce the gap driving amount in the gap change portion, and to improve the accuracy of the gap control.

In the optical module of the aspect of the invention, it is preferable that the gap for extracting light of a longest wavelength in the second wavelength region is larger than the gap for extracting light of a shortest wavelength in the first wavelength region.

With this configuration, the maximum value of the gap for extracting the light of the second wavelength region is larger than the minimum value of the gap for extracting the light of the first wavelength region. In this case, a range (gap driving range) for changing the gap in order to extract each wavelength of the first wavelength region and at least a portion of the gap driving range for extracting each wavelength of the second wavelength overlap each other. Thereby, it is possible to further reduce the gap driving amount, to further improve the accuracy of the gap control, and to further improve the accuracy of measurement.

For example, a case is illustrated in which the light of the wavelength to be measured is extracted by setting the measurement wavelength region of 400 nm to 700 nm to a pitch of 20 nm, the first wavelength region is set to 400 nm to 600 nm, the second wavelength region is set to 620 nm to 700 nm, the gap corresponding to a tertiary peak wavelength (order m=3) is set with respect to the first wavelength region, and the gap corresponding to a secondary peak wavelength (order m=2) is set with respect to the second wavelength region. In this case, in order to extract each wavelength of the first wavelength region as the tertiary peak wavelength, the gap driving range is set to 540 nm to 845 nm. In addition, in order to extract each wavelength of the second wavelength region as the secondary peak wavelength, the gap driving range is set to 565 nm to 646 nm. Therefore, in this case, the gap driving range for extracting each wavelength of the second wavelength region as the secondary peak wavelength is included in the gap driving range for extracting each wavelength of the first wavelength region as the tertiary peak wavelength. Therefore, it is possible to simultaneously extract the light of each wavelength of the second wavelength region within the gap driving range for extracting each wavelength of the first wavelength region, and to reduce the gap driving amount without the separate setting of the gap driving amount corresponding to the second wavelength region.

In the optical module of the aspect of the invention, it is preferable that the gap control unit acquires the gap with respect to each of a plurality of the wavelengths to be measured included in the measurement wavelength region, and performs a sequential change to the acquired gap from a maximum value of the gap in a direction in which the gap is reduced.

When the light of each wavelength of the first wavelength region is extracted, and then the light of each wavelength of the second wavelength region is extracted, driving is required in which the gap is changed from an initial gap up to the gap corresponding to the shortest wavelength of the first wavelength region, and then is changed, again, up to the gap corresponding to the longest wavelength of the second wavelength region, and then is changed up to the gap corresponding to the shortest wavelength of the second wavelength region. Therefore, the total driving amount of the gap change portion increases. It is also considered that the gap is changed up to the gap corresponding to the shortest wavelength of the first wavelength region, and then the gap is sequentially changed from the gap corresponding to the shortest wavelength of the second wavelength region up to the gap corresponding to the longest wavelength. However, in this case, the total driving amount of the gap change portion also increases.

On the other hand, in the configuration described above, since the gap is sequentially switched and changed in a direction in which the gap decreases from an initial gap, the gap change portion is driven by one stroke (during the driving from an initial gap to a predetermined minimum gap), and thus it is possible to extract the light of each wavelength to be measured of the measurement wavelength region, and to reduce the total driving amount in the gap change portion.

Another aspect of the invention is directed to an electronic device including: a first reflective film that transmits a portion of incident light and reflects a portion thereof; a second reflective film, disposed so as to face the first reflective film, which reflects a portion of incident light and transmits a portion thereof; a gap change unit that changes a size of a gap between the first reflective film and the second reflective film; a gap control unit that controls the gap change portion; and a processing control unit that performs a predetermined process on the basis of light extracted by the first reflective film and the second reflective film, wherein the gap control unit controls the gap change portion on the basis of a wavelength to be measured and an order of a spectrum which is set with respect to each of two or more wavelength regions.

In this aspect of the invention, similarly to the above-mentioned aspect of the invention, it is possible to suppress malfunction due to the interposition of foreign substances between the first reflective film and the second reflective film, and to thereby suppress malfunction in the electronic device.

In addition, since it is possible to improve the accuracy of the gap control, and to extract light of a desired wavelength to be measured by high-precision gap control, it is possible to perform a high-precision process in the processing control unit. For example, in the processing control unit, when a spectrum analysis of the light extracted by the first reflective film and the second reflective film is performed, the processing control unit acquires the light of the desired wavelength to be measured which is extracted by the high-precision gap control, and thus may perform a high-precision spectrum analysis process.

In the electronic device of the aspect of the invention, it is preferable that the electronic device further includes a detection unit that detects the light extracted by the first reflective film and the second reflective film, and the processing control unit causes a transformation matrix for transforming a measurement spectrum into an optical spectrum to act on the measurement spectrum based on the amount of light of each wavelength to be measured which is detected by the detection unit, and estimates an optical spectrum of measurement light incident on the first reflective film and the second reflective film.

With this configuration, the processing control unit detects the amount of light of multiple wavelengths to be measured within the measurement wavelength region, causes a transformation matrix to act on the wavelengths to be measured, and thus performs a spectrum estimation for estimating an optical spectrum. In such a spectrum estimation, for example, even when peak wavelengths other than the wavelength to be measured are included in the light extracted by the first reflective film and the second reflective film, or the half-value width of the light of the wavelength to be measured which is extracted by the first reflective film and the second reflective film is large, it is possible to obtain a high-precision optical spectrum.

Still another aspect of the invention is directed to a method of driving a wavelength variable interference filter including a first reflective film that transmits a portion of incident light and reflects a portion thereof, a second reflective film, disposed so as to face the first reflective film, which reflects a portion of incident light and transmits a portion thereof, and a gap change portion that changes a size of a gap between the first reflective film and the second reflective film, the driving method includes: controlling the gap change portion on the basis of a wavelength to be measured and an order of a spectrum which is set with respect to each of two or more wavelength regions.

With this configuration, at the time of driving the wavelength variable interference filter including the first reflective film and the second reflective film, and the gap change portion that changes the gap between the first reflective film and the second reflective film, the gap change portion is controlled on the basis of an order which is set in accordance with the wavelength to be measured so that the light of the wavelength to be measured is extracted using a peak wavelength of the set order.

For this reason, when a higher order is set even in a case where the wavelength to be measured is a short wavelength, and the gap between the first reflective film and the second reflective film is required to be reduced, it is possible to reduce a risk of foreign substances or the like being interposed due to an excessive reduction in the gap, and to suppress the malfunction of the wavelength variable interference filter.

In addition, when the wavelength to be measured is extracted only using a higher order, the gap driving amount increases, and the accuracy of the gap control in the gap change portion deteriorates. On the other hand, in the aspect of the invention, a low order is set with respect to the wavelength to be measured which has no risk of foreign substances being interposed between the first reflective film and the second reflective film as mentioned above, and thus it is possible to improve the accuracy of the gap control in the gap change portion.

Yet another aspect of the invention is directed to an optical module including: a first reflective film that transmits a portion of incident light and reflects a portion thereof; a second reflective film, disposed so as to face the first reflective film, which reflects a portion of incident light and transmits a portion thereof; and a gap change portion that changes a size of a gap between the first reflective film and the second reflective film, wherein when m and n are set to different natural numbers, light of a first wavelength region is detected using an m-th peak wavelength, and light of a second wavelength region different from the first wavelength region is detected using an n-th peak wavelength.

In this aspect of the invention, when the light of the wavelength to be measured belonging to the first wavelength region is detected, the light of the wavelength to be measured is detected using a peak wavelength of the order m, and when the light of the wavelength to be measured belonging to the second wavelength region is detected, the light of the wavelength to be measured is detected using a peak wavelength of the order n.

For this reason, similarly to the aspect of the invention, it is possible to avoid the disadvantage of foreign substances being interposed due to a reduction in the size between the reflective films, and to reduce the driving amount of the gap change portion for detecting each wavelength to be measured of the measurement wavelength region.

In the optical module of the aspect of the invention, it is preferable that the first wavelength region has a shorter wavelength than that of the second wavelength region, and a relation of $m=n+1$ is satisfied.

With this configuration, when the size between the reflective films is reduced, and the light of the first wavelength region having the high possibility of foreign substances being interposed is detected, the order m which is larger than the order n by 1 with respect to the second wavelength region is used. Thereby, it is possible to effectively avoid the disadvantage of foreign substances being interposed. In addition, as compared to a case where the order m is made to be larger than the order n by 2 or more, it is possible to reduce the driving amount of the gap change portion, and to suppress a deterioration in the accuracy of measurement.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the accompanying drawings.

Configuration of Spectrometer 1

Figure 1:
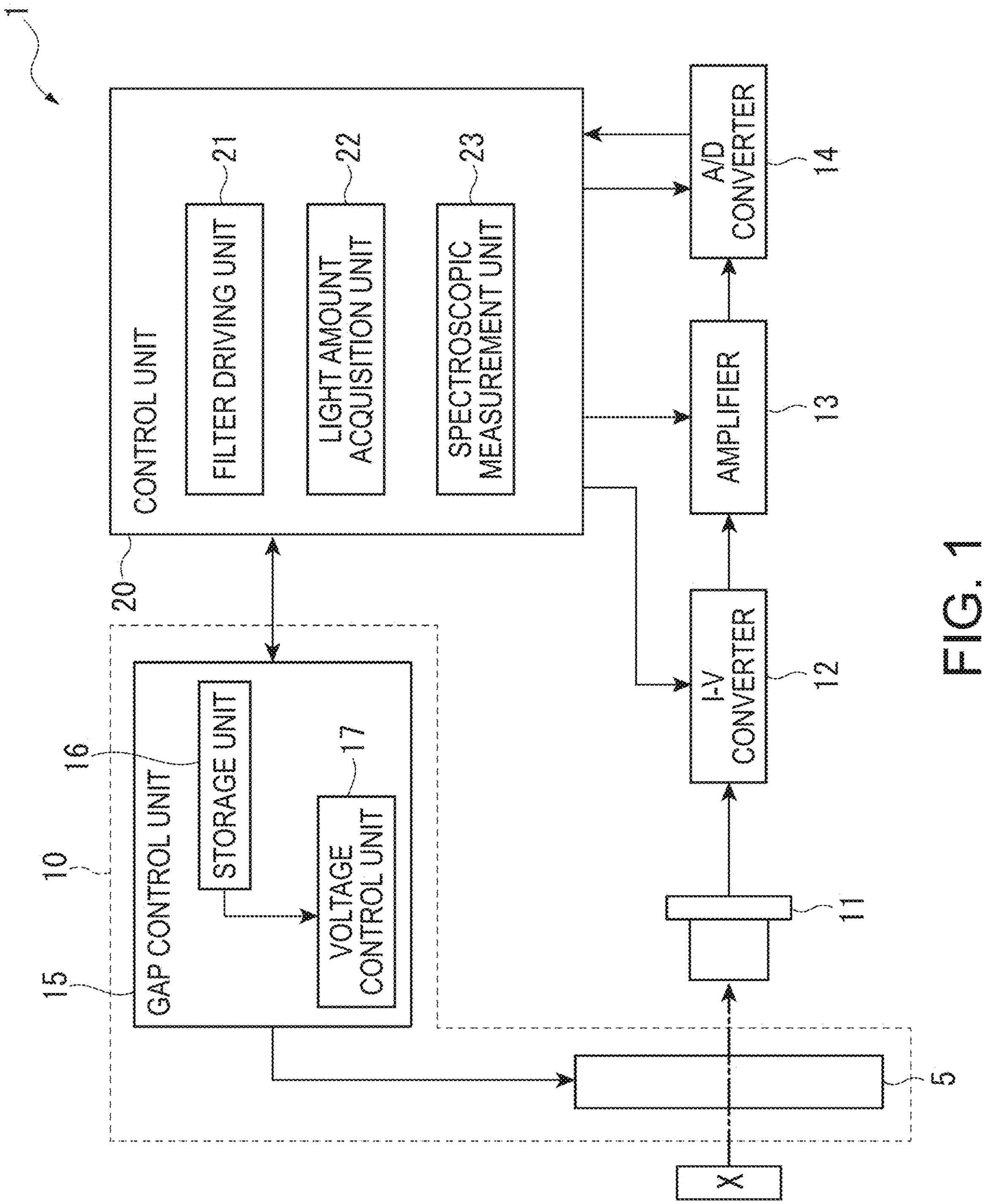
FIG. 1 is a block diagram illustrating a schematic configuration of a spectrometer according to a first embodiment of the invention.

FIG. 1 is a block diagram illustrating a schematic configuration of a spectrometer according to the first embodiment of the invention.

The spectrometer 1 is an example of an electronic device of the invention, and is a device that measures a spectrum of light to be measured, on the basis of the light to be measured which is reflected from a measuring object X. Meanwhile, in the present embodiment, an example is shown in which the light to be measured which is reflected from the measuring object X is measured. However, when an illuminant such as, for example, a liquid crystal panel is used as the measuring object X, light emitted from the illuminant may be used as the light to be measured.

As shown in FIG. 1, the spectrometer 1 includes an optical module 10, a detector 11, an I-V converter 12, an amplifier 13, an A/D converter 14, and a control unit 20.

The detector 11 receives light passing through a wavelength variable interference filter 5 of the optical module 10, and outputs a detection signal (current) in accordance with the light intensity of the received light.

The I-V converter 12 converts a detection signal which is input from the detector 11 into a voltage value, and outputs the converted value to the amplifier 13.

The amplifier 13 amplifies a voltage (detection voltage) in accordance with the detection signal which is input from the I-V converter 12.

The A/D converter 14 converts a detection voltage (analog signal) which is input from the amplifier 13 into a digital signal, and outputs the converted signal to the control unit 20.

Configuration of Optical Module 10

Next, the configuration of the optical module 10 will be described below.

As shown in FIG. 1, the optical module 10 includes the wavelength variable interference filter 5 and a gap control unit 15.

Configuration of Wavelength Variable Interference Filter 5

Figure 2:
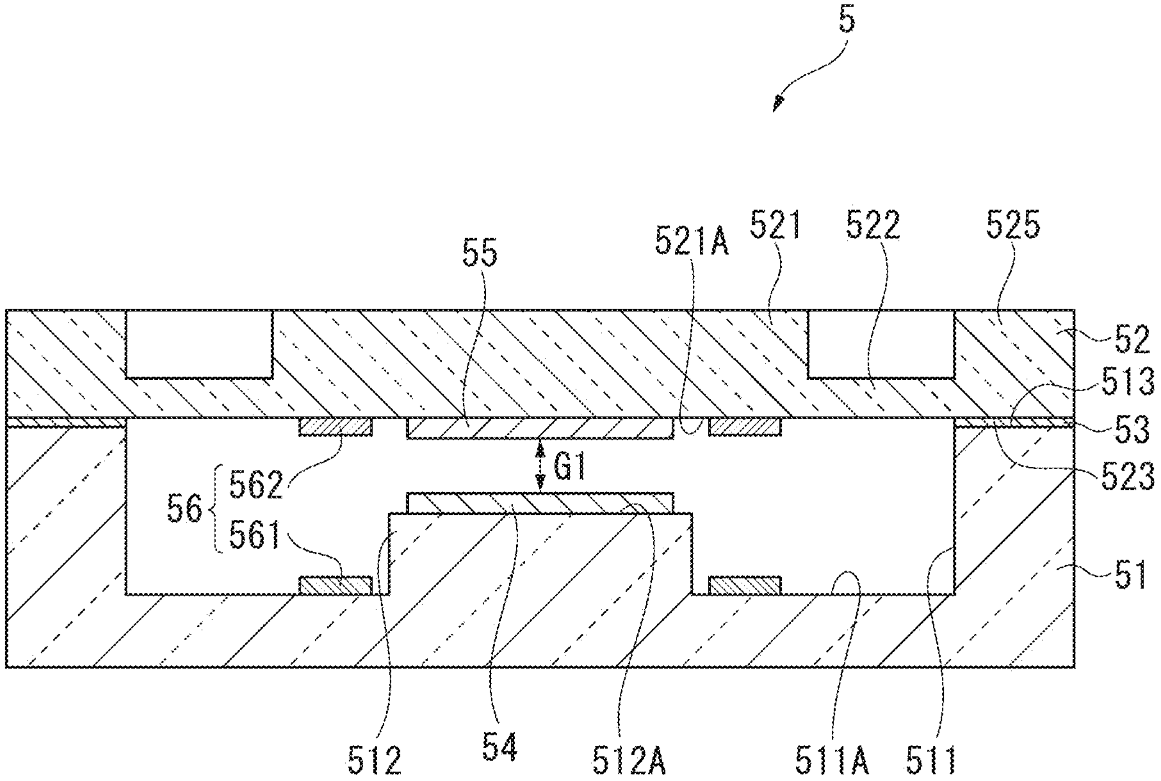
FIG. 2 is a cross-sectional view illustrating a schematic configuration of a wavelength variable interference filter in the first embodiment.

FIG. 2 is a cross-sectional view illustrating a schematic configuration of the wavelength variable interference filter 5.

The wavelength variable interference filter 5 of the present embodiment is a so-called Fabry-Perot etalon. As shown in FIG. 2, the wavelength variable interference filter 5 includes a fixed substrate 51 and a movable substrate 52. The fixed substrate 51 and the movable substrate 52 are formed of, for example, various types of glass, quartz crystal, silicon, or the like. The fixed substrate 51 and the movable substrate 52 are integrally formed through the bonding of a first bonding portion 513 of the fixed substrate 51 to a second bonding portion 523 of the movable substrate using a bonding film 53 which is constituted by, for example, a siloxane-based plasma polymerized film and the like.

The fixed substrate 51 is provided with a fixed reflective film 54 (first reflective film), and the movable substrate 52 is provided with a movable reflective film 55 (second reflective film). The fixed reflective film 54 and the movable reflective film 55 are disposed so as to face each other with a gap G1 (gap) between reflective films interposed therebetween. The wavelength variable interference filter 5 is provided with an electrostatic actuator 56 used for adjusting (changing) the size of the gap G1 between the reflective films (distance or gap between the reflective films 54 and 55). The electrostatic actuator 56 is constituted by a fixed electrode 561 provided on the fixed substrate 51 and a movable electrode 562 provided on the movable substrate 52. The fixed electrode 561 and the movable electrode 562 face each other with an inter-electrode gap interposed therebetween, and function as the electrostatic actuator 56 (gap change portion). Here, the fixed electrode 561 and the movable electrode 562 may be provided directly on the surfaces of the fixed substrate 51 and the movable substrate 52, respectively, and may be provided through another film member. Meanwhile, in FIG. 2, an example is shown in which the size of the inter-electrode gap is larger than the size of the gap G1 between the reflective films, but a configuration may be used in which the inter-electrode gap is smaller than the gap G1 between the reflective films.

Hereinafter, the configuration of the wavelength variable interference filter 5 will be described in more detail.

An electrode installing groove 511 and a reflective film installing portion 512 are formed on the fixed substrate 51 by etching. The fixed substrate 51 is formed so as to have a thickness larger than that of the movable substrate 52, and thus there is no electrostatic attractive force when a voltage is applied to the electrostatic actuator 56, or no bending of the fixed substrate 51 due to internal stress of the fixed electrode 561.

The electrode installing groove 511 is formed, for example, in a circular shape centered on the planar center point of the fixed substrate 51. In the above-mentioned planar view, the reflective film installing portion 512 is formed so as to protrude from the central portion of the electrode installing groove 511 to the movable substrate 52 side. The groove bottom of the electrode installing groove 511 is an electrode installing surface 511A on which the fixed electrode 561 is disposed. In addition, the protruding apical surface of the reflective film installing portion 512 is a reflective film installing surface 512A.

In addition, although not shown in the drawing, the fixed substrate 51 is provided with an electrode extraction groove extending from the electrode installing groove 511 toward the outer circumferential edge of the fixed substrate 51, and is provided with an extraction electrode of the fixed electrode 561 provided in the electrode installing groove 511.

The fixed electrode 561 is provided on the electrode installing surface 511A of the electrode installing groove 511. More specifically, the fixed electrode 561 is provided on a region facing the movable electrode 562 of the movable portion 521, described later, in the electrode installing surface 511A. In addition, an insulating film for securing insulating properties between the fixed electrode 561 and the movable electrode 562 may be laminated on the fixed electrode 561. In addition, a fixed extraction electrode is connected to the fixed electrode 561. The fixed extraction electrode is extracted from the above-mentioned electrode extraction groove to the outer circumferential portion of the fixed substrate 51, and is connected to the gap control unit 15.

Meanwhile, in the embodiment, the configuration is shown in which one fixed electrode 561 is provided on the electrode installing surface 511A, but a configuration (double electrode configuration) or the like may be formed, for example, in which two electrodes having a concentric circle centered on the planar center point are provided.

As mentioned above, the reflective film installing portion 512 is formed coaxially with the electrode installing groove 511 and in a substantially cylindrical shape having a diameter smaller than that of the electrode installing groove 511, and includes the reflective film installing surface 512A that faces the movable substrate 52 of the reflective film installing portion 512.

The fixed reflective film 54 is installed on the reflective film installing portion 512. As the fixed reflective film 54, for example, a metal film such as Ag, an alloy film such as an Ag alloy can be used. In addition, for example, a dielectric multilayer film in which a high refractive layer is formed of $TiO_2$ and a low refractive layer is formed of $SiO_2$ may be used. Further, a reflective film in which a metal film (or alloy film) is laminated on a dielectric multilayer film, a reflective film in which a dielectric multilayer film is laminated on a metal film (or an alloy film), a reflective film in which a single-layer refractive layer (such as $TiO_2$ or $SiO_2$) and a metal film (or an alloy film) are laminated, or the like may be used.

In addition, on the light incidence plane (plane on which the fixed reflective film 54 is not provided) of the fixed substrate 51, an anti-reflective film may be formed at a position corresponding to the fixed reflective film 54. Since this anti-reflective film can be formed by alternately laminating a low refractive index film and a high refractive index film, the reflectance of visible light from the surface of the fixed substrate 51 is reduced, and the transmittance thereof is increased.

The movable substrate 52 includes the circle-shaped movable portion 521 centered on the planar center point, a holding portion 522 which is coaxial with the movable portion 521 and holds the movable portion 521, and a substrate outer circumferential portion 525 provided outside the holding portion 522.

The movable portion 521 is formed so as to have a thickness larger than that of the holding portion 522, and is formed so as to have the same thickness as that of the movable substrate 52, for example, in the embodiment. In the planar view of the filter, the movable portion 521 is formed so as to have a diameter larger than at least the diameter of the outer circumferential edge of the reflective film installing surface 512A. The movable portion 521 is provided with the movable electrode 562 and the movable reflective film 55.

Meanwhile, similarly to the fixed substrate 51, an anti-reflective film may be formed on the surface of the movable portion 521 on the opposite side to the fixed substrate 51. Such an anti-reflective film can be formed by alternately laminating a low refractive index film and a high refractive index film, thereby allowing the reflectance of visible light from the surface of the movable substrate 52 to be reduced, and the transmittance thereof to be increased.

The movable electrode 562 faces the fixed electrode 561 with the inter-electrode gap interposed therebetween, and is formed in a circular shape having the same shape as that of the fixed electrode 561. In addition, although not shown in the drawing, the movable substrate 52 is provided with a movable extraction electrode extending from the outer circumferential edge of the movable electrode 562 toward the outer circumferential edge of the movable substrate 52. The movable extraction electrode is connected to the gap control unit 15, similarly to the fixed extraction electrode.

On the central portion of a movable surface 521A of the movable portion 521, the movable reflective film 55 is provided facing the fixed reflective film 54 with the gap G1 between the reflective films interposed therebetween. As the movable reflective film 55, a reflective film having the same configuration as that of the above-mentioned fixed reflective film 54 is used.

The holding portion 522 is a diaphragm that surrounds the periphery of the movable portion 521, and is formed so as to have a thickness smaller than that of the movable portion 521. Such a holding portion 522 is more likely to be bent than the movable portion 521, and thus can cause the movable portion 521 to be displaced to the fixed substrate 51 side due to slight electrostatic attractive force. At this time, the movable portion 521 has a thickness larger than that of the holding portion 522, and has a rigidity larger than that. Thus, even when the holding portion 522 is pulled to the fixed substrate 51 side due to electrostatic attractive force, a change in the shape of the movable portion 521 is not caused. Therefore, the movable reflective film 55 provided on the movable portion 521 is not only bent, but also the fixed reflective film 54 and movable reflective film 55 can always be maintained to the parallel state.

Meanwhile, in the embodiment, the diaphragm-shaped holding portion 522 is illustrated by way of example, but without being limited thereto, for example, beam-shaped holding portions which are disposed at equiangular intervals centered on the planar center point may be provided.

As mentioned above, the substrate outer circumferential portion 525 is provided outside the holding portion 522 in the planar view of the filter. The surface of the substrate outer circumferential portion 525 facing the fixed substrate 51 includes the second bonding portion 523 which faces the first bonding portion 513, and the second bonding portion 523 is bonded to the first bonding portion 513 by the bonding film 53.

Configuration of Gap Control Unit 15

As shown in FIG. 1, the gap control unit 15 includes a storage unit 16 and a voltage control unit 17.

The storage unit 16 is constituted by, for example, a semiconductor memory such as a ROM and a RAM. V-λ data indicating a relationship between a wavelength (wavelength to be measured) of light extracted by the wavelength variable interference filter 5 and a voltage applied to the electrostatic actuator 56 is stored in the storage unit 16.

Here, a relationship between the wavelength of light passing through the wavelength variable interference filter 5 and the gap G1 between the reflective films is shown in Table 1. Meanwhile, here, a case in which an Ag alloy is used as the fixed reflective film 54 is assumed. In addition, an example of a relationship between the wavelength to be measured in the present embodiment and the gap G1 between the reflective films for extracting light of the wavelength to be measured is shown in Table 2.

TABLE 1

| | Gap between Reflective Films (nm) | | | |
|---|---|---|---|---|
| Wavelength (nm) | Primary Peak | Secondary Peak | Tertiary Peak | Quartic Peak |
| 400 | 139.3 | 340.1 | 540.2 | 740.5 |
| 420 | 151.0 | 361.2 | 571.3 | 781.3 |
| 440 | 161.9 | 381.9 | 602.0 | 821.9 |
| 460 | 172.5 | 402.5 | 632.4 | 862.3 |
| 480 | 183.1 | 423.0 | 662.9 | 903.0 |
| 500 | 193.6 | 443.6 | 693.5 | 943.5 |
| 520 | 204.0 | 464.0 | 723.9 | 984.0 |
| 540 | 214.3 | 484.3 | 754.3 | 1024.3 |
| 560 | 224.6 | 504.5 | 784.5 | 1064.5 |
| 580 | 234.8 | 524.7 | 814.7 | 1104.7 |
| 600 | 245.1 | 545.0 | 845.1 | 1144.9 |
| 620 | 255.4 | 565.3 | 875.3 | 1185.3 |
| 640 | 265.6 | 585.5 | 905.5 | 1225.4 |
| 660 | 275.8 | 605.7 | 935.7 | 1265.6 |
| 680 | 285.9 | 625.9 | 965.9 | 1305.9 |
| 700 | 296.1 | 646.0 | 996.1 | 1346.1 |
| Maximum Gap | 296.1 | 646.0 | 996.1 | 1346.1 |
| Minimum Gap | 139.3 | 340.1 | 540.2 | 740.5 |
| Driving Amount | 156.9 | 306.0 | 455.9 | 605.6 |

TABLE 2

| Wave-length to Be measured (nm) | Gap between Reflective Films (nm) | Voltage (V) | Order |
|---|---|---|---|
| 400 | 340.1 | 23.0 | 2 |
| 420 | 361.2 | 20.1 | |
| 440 | 381.9 | 16.5 | |
| 460 | 402.5 | 12.1 | |
| 480 | 423.0 | 7.0 | |
| 500 | 193.6 | 31.7 | 1 |
| 520 | 204.0 | 31.4 | |
| 540 | 214.3 | 31.1 | |
| 560 | 224.6 | 30.8 | |
| 580 | 234.8 | 30.4 | |
| 600 | 245.1 | 30.0 | |
| 620 | 255.4 | 29.6 | |
| 640 | 265.6 | 29.1 | |
| 660 | 275.8 | 28.6 | |

TABLE 2-continued

| Wave-length to Be measured (nm) | Gap between Reflective Films (nm) | Voltage (V) | Order |
|---|---|---|---|
| 680 | 285.9 | 28.0 | |
| 700 | 296.1 | 27.3 | |

In the present embodiment, as the V-λ data, as shown in Table 2, a voltage value for setting the gap G1 between the reflective films, having a clearance size of 340.1 nm to 423.0 nm, corresponding to a secondary peak wavelength with respect to a wavelength of 400 nm to 480 nm (first wavelength region) is recorded, and a voltage value for setting the gap G1 between the reflective films, having a clearance size of 193.6 nm to 296.1 nm, corresponding to a primary peak wavelength with respect to a wavelength of 500 nm to 700 nm (second wavelength region) is recorded.

Meanwhile, in the present embodiment, an example is illustrated in which the voltage for the wavelength to be measured is recorded in the V-λ data, but data in which the voltage and the gap G1 between the reflective films are associated with each other may be used for the wavelength to be measured, without being limited thereto. Further, G-λ data showing a relationship between the gap G1 between the reflective films and the wavelength to be measured as shown in Table 2 and V-G data showing a voltage for the gap G1 between the reflective films may be recorded.

The voltage control unit 17 is connected to the control unit 20, the storage unit 16 and the electrostatic actuator 56 of the wavelength variable interference filter 5, and controls the gap G1 between the reflective films by changing a voltage applied to the electrostatic actuator 56 on the basis of a command from the control unit 20.

Specifically, when a command for specifying the wavelength to be measured is input from the control unit 20, the voltage control unit 17 acquires a voltage value corresponding to the wavelength to be measured specified from the V-λ data of the storage unit 16, and applies a voltage to the electrostatic actuator 56 of the wavelength variable interference filter 5. Thereby, as shown in Table 2 mentioned above, the clearance size of the gap G1 between the reflective films for the wavelength to be measured is set by the electrostatic actuator 56.

Configuration of Control Unit 20

Returning to FIG. 1, the control unit 20 of the spectrometer 1 will be described.

The control unit 20 is equivalent to a processing unit according to the invention, is configured by a combination of, for example, a CPU, a memory and the like, and controls the entire operation of the spectrometer 1. As shown in FIG. 1, the control unit 20 includes a filter driving unit 21, a light amount acquisition unit 22, and a spectroscopic measurement unit 23.

The filter driving unit 21 outputs a command signal for causing light of a predetermined measurement wavelength region to pass through the wavelength variable interference filter 5 at a predetermined measurement pitch, to the gap control unit 15 of the optical module 10.

The light amount acquisition unit 22 acquires the amount (intensity) of light received in the detector 11, on the basis of a signal (voltage) which is input from the A/D converter 14.

The spectroscopic measurement unit 23 measures spectral characteristics of light to be measured, on the basis of the amount of light acquired by the light amount acquisition unit 22.

Figure 3:
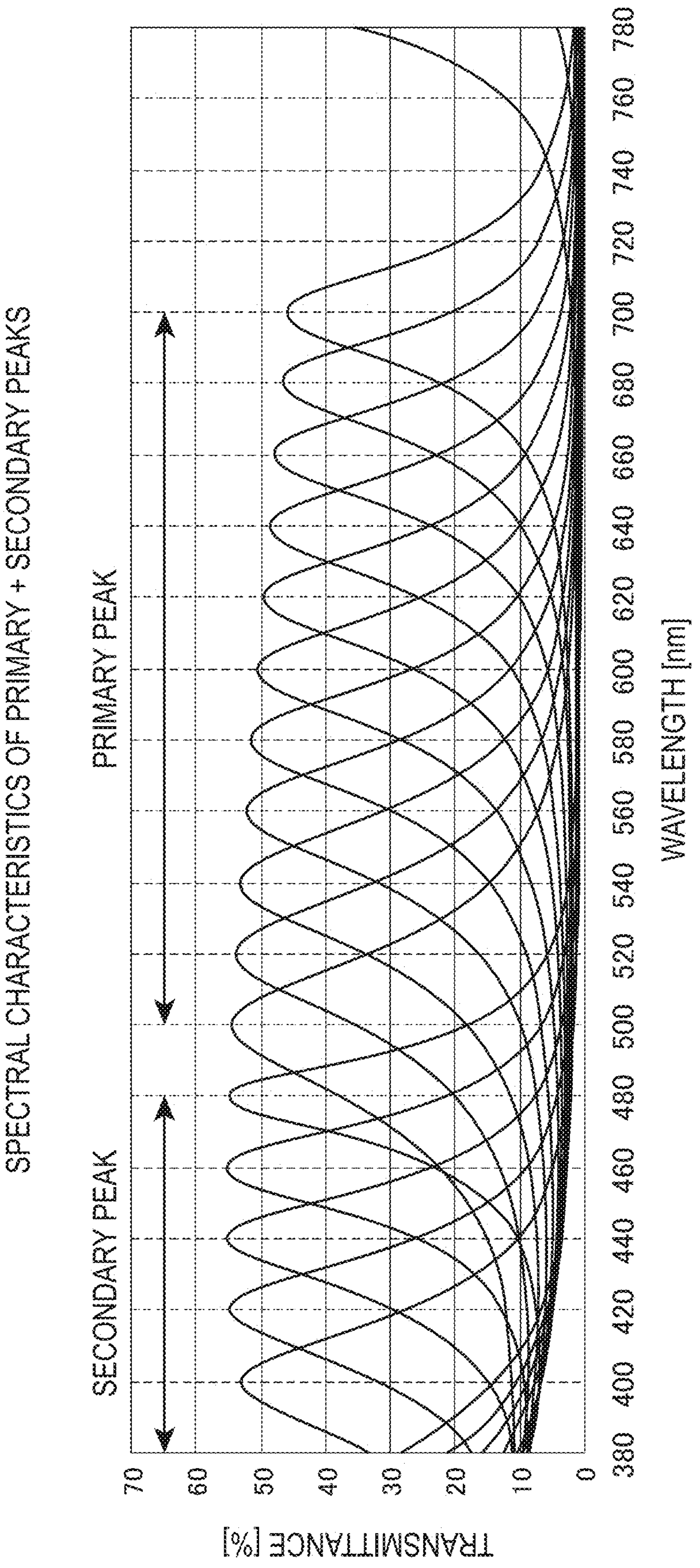
FIG. 3 is a diagram illustrating an example of transmittance characteristics of the wavelength variable interference filter in the first embodiment.

FIG. 3 is a diagram illustrating transmittance characteristics of the wavelength variable interference filter 5 when the wavelength variable interference filter 5 is driven on the basis of the V-λ data corresponding to Table 2.

When the wavelength variable interference filter 5 is driven on the basis of the V-λ data corresponding to Table 2, as mentioned above, light of the wavelength to be measured is transmitted using the secondary peak wavelength with respect to the first wavelength region of 400 nm to 480 nm, and light of the wavelength to be measured is transmitted using the primary peak wavelength with respect to the second wavelength region of 500 nm to 700 nm. In this case, as shown in FIG. 3, when the light of the wavelength to be measured of the second wavelength region is extracted, the light in the first wavelength region is not transmitted simultaneously.

However, when the wavelength to be measured is extracted using a higher-order peak wavelength, light of a peak wavelength different from the wavelength to be measured is extracted simultaneously, and a noise component is included accordingly.

For example, when the light of the wavelength to be measured is transmitted by a tertiary peak wavelength with respect to the first wavelength region, and the light of the wavelength to be measured is transmitted using the secondary peak wavelength with respect to the second wavelength region, as shown in Table 1, light in the vicinity of a wavelength of 600 nm is simultaneously extracted as the secondary peak wavelength, for example, at the time of extracting light of a wavelength of 400 nm as the tertiary peak wavelength. Similarly, when the wavelength to be measured of the second wavelength region is extracted, the light of the first wavelength region is also extracted as the tertiary peak wavelength.

Therefore, in order to obtain an optical spectrum of the light reflected from the measuring object X, the spectroscopic measurement unit 23 performs a spectrum estimation process of estimating an optical spectrum from the amount of light for the multiple wavelengths to be measured which is obtained by the light amount acquisition unit 22. In addition, the amount of light acquired by the light amount acquisition unit 22 includes, to be exact, not only the amount of light of the wavelength to be measured, but also light of a predetermined wavelength width centered on the wavelength to be measured. For this reason, even when the light is extracted from the wavelength variable interference filter 5 on the basis of the V-λ data as shown in Table 2, the spectrum estimation process is preferably performed by the spectroscopic measurement unit 23.

Hereinafter, an example of the spectrum estimation process in the spectroscopic measurement unit 23 will be described.

As shown in the following Expression (2), the spectroscopic measurement unit 23 estimates an optical spectrum S of the light to be measured (light reflected from the measuring object X) by causing an estimation matrix Ms (transformation matrix) stored in a storage unit (not shown) such as, for example, a memory to act on a measurement spectrum (amount of light for each wavelength to be measured) D obtained by the light amount acquisition unit 22.

Meanwhile, the spectrometer 1 measures reference light in which a precise optical spectrum S0 is measured in advance, and thus the estimation matrix Ms is calculated from a measurement spectrum D0 obtained by the measurement, and the precise optical spectrum S0.

$$S^t = Ms \cdot D^t \tag{2}$$

In the above Expression (2), "t" denotes a transposed vector. In Expression (2), the optical spectrum S and the measurement spectrum D are denoted as a "row vector", and thus the transposed vector becomes a "column vector".

When the above Expression (2) is represented in a state where each element is specified, the expression is represented as Expression (3).

$$\begin{pmatrix} s1 \\ s2 \\ s3 \\ \vdots \\ s59 \\ s60 \\ s61 \end{pmatrix} = \begin{pmatrix} m1\cdot 1 & m1\cdot 2 & m1\cdot 3 & \ldots & m1\cdot 16 \\ m2\cdot 1 & m2\cdot 2 & m2\cdot 3 & \ldots & m2\cdot 16 \\ m3\cdot 1 & m3\cdot 2 & m3\cdot 3 & \ldots & m3\cdot 16 \\ \vdots & \vdots & \vdots & & \vdots \\ m59\cdot 1 & m59\cdot 2 & m59\cdot 3 & \ldots & m59\cdot 16 \\ m60\cdot 1 & m60\cdot 2 & m60\cdot 3 & \ldots & m60\cdot 16 \\ m61\cdot 1 & m61\cdot 2 & m61\cdot 3 & \ldots & m61\cdot 16 \end{pmatrix} \begin{pmatrix} d1 \\ d2 \\ d3 \\ \vdots \\ d14 \\ d15 \\ d16 \end{pmatrix} \tag{3}$$

In the above Expression (3), the measurement spectrum D is constituted by elements of a number equivalent to the number of wavelengths (number of bands) to be measured in the spectrometer 1. In the example shown in Table 2, the measurement wavelength region (400 nm to 700 nm) is measured at a pitch of 20 nm, and thus is constituted by sixteen elements of d1 to d16 in the above Expression (3). Meanwhile, these elements of d1 to d16 become the amount of light acquired by the light amount acquisition unit 22 with respect to each wavelength to be measured.

In addition, the optical spectrum S is constituted by elements of a number equivalent to the number of wavelengths (number of spectra) to be estimated. For example, in the above Expression (3), the optical spectrum S is constituted by sixty-one elements of the row vector so that the optical spectrum S is estimated by setting a target wavelength region of 400 nm to 700 nm to a wavelength having a pitch of 5 nm.

Therefore, the estimation matrix Ms for estimating the optical spectrum S from the measurement spectrum D becomes a matrix of 61 rows×16 columns as shown in Expression (3).

Here, the number of elements of the measurement spectrum D is sixteen, whereas the number of elements of the optical spectrum S is sixty-one. Therefore, it is not possible to determine the estimation matrix Ms of 61 rows×16 columns simply by a set of measurement spectrum D and optical spectrum S. Therefore, the estimation matrix Ms is determined by measuring a plurality of sample light beams (reference light in which the optical spectrum S0 is measured in advance) using the spectrometer 1.

Such an estimation matrix Ms is determined as follows. That is, the plurality of sample light beams (reference light) in which the optical spectrum S is measured in advance is measured using the spectrometer 1, and the measurement spectrum D0 for each sample light beam is acquired.

Here, when the optical spectrum S is assumed to have elements of the number k of spectra (sixty-one in the case of Expression (3)), and the sample light beams of the number n of samples are measured, the optical spectrum S0 can be represented in the form of a matrix St as shown in the following Expression (4). In addition, the measurement spectrum D0 has elements of the number b of bands (16 in the case of Expression (3)), and measurement results are obtained with respect to the sample light beams of the number n of samples, respectively. Therefore, the measurement spectrum D0 can be represented in the form of a matrix Dt as shown in the following Expression (5).

$$S^t_{nk} = \begin{pmatrix} s1\cdot 1 & s1\cdot 2 & s1\cdot 3 & \ldots & s1\cdot n \\ s2\cdot 1 & s2\cdot 2 & s2\cdot 3 & \ldots & s2\cdot n \\ \vdots & \vdots & \vdots & & \vdots \\ s60\cdot 1 & s60\cdot 2 & s60\cdot 3 & & s60\cdot n \\ s61\cdot 1 & s61\cdot 2 & s61\cdot 3 & \ldots & s61\cdot n \end{pmatrix} \tag{4}$$

$$D^t_{nb} = \begin{pmatrix} d1\cdot 1 & d1\cdot 2 & d1\cdot 3 & \ldots & d1\cdot n \\ d2\cdot 1 & d2\cdot 2 & d2\cdot 3 & \ldots & d2\cdot n \\ \vdots & \vdots & \vdots & & \vdots \\ d15\cdot 1 & d15\cdot 2 & d15\cdot 3 & & d15\cdot n \\ d16\cdot 1 & d16\cdot 2 & d16\cdot 3 & \ldots & d16\cdot n \end{pmatrix} \tag{5}$$

An evaluation function F (Ms)=|St−Ms·Dt|2 is set indicating a deviation between the matrix St and the inner product (Ms·Dt) of the matrix Dt and the estimation matrix Ms, and the estimation matrix Ms is determined so that the evaluation function F (Ms) is minimized. That is, since a value obtained by partially differentiating the evaluation function F (Ms) by the estimation matrix Ms is equal to 0, the estimation matrix Ms can be determined by the following Expression (6).

$$Ms = (D^t \cdot D)^{-1} \cdot D^t \cdot S \tag{6}$$

Meanwhile, in the above description, an error is assumed not to be present in the optical spectrum S0 of the sample light which is reference light, but the estimation matrix Ms considering an error of the optical spectrum S0 of the sample light may be determined. That is, the optical spectrum S0 of the sample light is measured using a measuring device such as a multi-spectral colorimeter. However, in the measuring device, the optical spectrum S0 is measured by extracting light in an extremely narrow wavelength range of several nm or so. In this manner, when the extremely narrow wavelength range is extracted, the amount of light decreases, and an SN ratio lowers, which leads to a tendency for errors to be superimposed. In such a case, when a principal component analysis method is used, a matrix Snk can be represented as "Snk=anj·vjk" by setting a principal component number to j, setting a principal component value to a, and setting a principal component vector to v, and the estimation matrix Ms considering the error of the sample light can also be calculated.

Meanwhile, other estimation process may be performed is minimized. That is, since a value obtained by partially differentiating the evaluation function without being limited to the above-mentioned spectrum estimation process.

For example, as shown in Table 2, when a plurality of peak wavelengths are not included in the light passing through the wavelength variable interference filter 5, it is possible to use a spectrum estimation of the related art. That is, spectral sensitivity characteristics (transmittance characteristics in each wavelength to be measured) in the wavelength variable interference filter 5 are tested in advance, and are stored in a storage unit such as a memory (not shown), thereby allowing the optical spectrum to be estimated on the basis of the spectral sensitivity characteristics and the amount of light acquired (amount of light measured).

In addition, as a method of the spectrum estimation process of the spectroscopic measurement unit 23, for example, a Wiener estimation method or the like may be used without being limited to two methods as mentioned above.

Spectrometric Process Using Spectrometer 1

Figure 4:
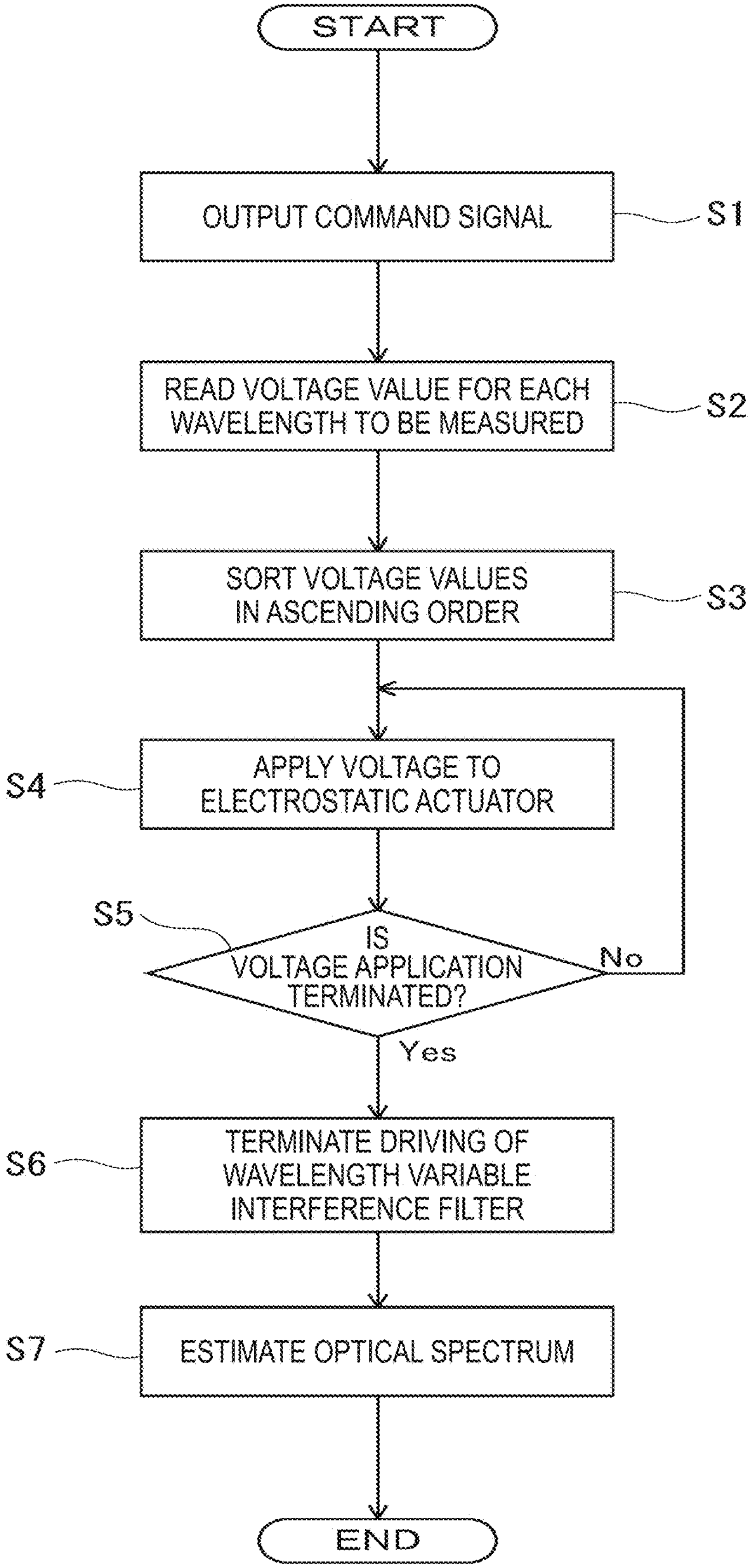
FIG. 4 is a flow diagram illustrating a spectrometric process of the spectrometer in the first embodiment.

FIG. 4 is a flow diagram illustrating a spectrometric process of the spectrometer 1.

In order to measure the optical spectrum of light to be measured using the spectrometer 1, first, the filter driving unit 21 of the control unit 20 causes the optical module 10 to drive the wavelength variable interference filter 5, and outputs a command signal for transmitting light at a predetermined measurement pitch (for example, 20 nm) with respect to a predetermined measurement wavelength region (for example, 400 nm to 700 nm) (step S1).

When the command signal is input from the control unit 20, the voltage control unit 17 of the gap control unit 15 reads a voltage value corresponding to each wavelength to be measured, from the V-λ data of the storage unit 16 (step S2). The voltage control unit 17 then sorts the read voltage values in ascending order (step S3), and the voltages are sequentially applied to the electrostatic actuator 56 of the wavelength variable interference filter 5 (step S4). Thereby, the gap G1 between the reflective films of the wavelength variable interference filter 5 is sequentially switched in a direction in which the clearance size decreases, from an initial gap, and the light of each wavelength to be measured is sequentially transmitted. Therefore, as shown in Table 2, when the light of the wavelength to be measured is extracted using the secondary peak wavelength with respect to the first wavelength region, and the light of the wavelength to be measured is extracted using the primary peak wavelength with respect to the second wavelength region, light of 600 nm of the first wavelength region is first transmitted as the secondary peak wavelength, and a transmission wavelength is shortened at a pitch of 20 nm. After light of 400 nm is transmitted as the secondary peak wavelength, light of 700 nm of the second wavelength region is transmitted as the primary peak wavelength. Until light of 620 nm is transmitted as the primary peak wavelength, a transmission wavelength is shortened at a pitch of 20 nm.

Meanwhile, the light amount acquisition unit 22 sequentially acquires the amount of light which passes through the wavelength variable interference filter 5 and is received in the detector 11, and stores the amount of light acquired, in the storage unit such as a memory.

Thereafter, the gap control unit 15 determines whether all the voltages which are read in step S2 are applied (step S5). In step S5, when it is determined to be "No", that is, when a voltage to be applied remains, the voltage is applied to the electrostatic actuator 56 returning to step S4, and light of a corresponding wavelength to be measured is transmitted.

On the other hand, when it is determined to be "Yes" in step S5, the gap control unit 15 terminates the driving of the wavelength variable interference filter 5 (step S6).

Thereafter, the spectroscopic measurement unit 23 performs the spectrum estimation using the amount of light (measurement spectrum D) stored in the storage unit and the estimation matrix Ms (step S7).

Gap Between Reflective Films when Wavelength Variable Interference Filter 5 is Driven Next, in the spectrometric process as mentioned above, a description will be made of the distance of the gap G1 between the reflective films when the wavelength variable interference filter 5 is driven.

Figure 5:
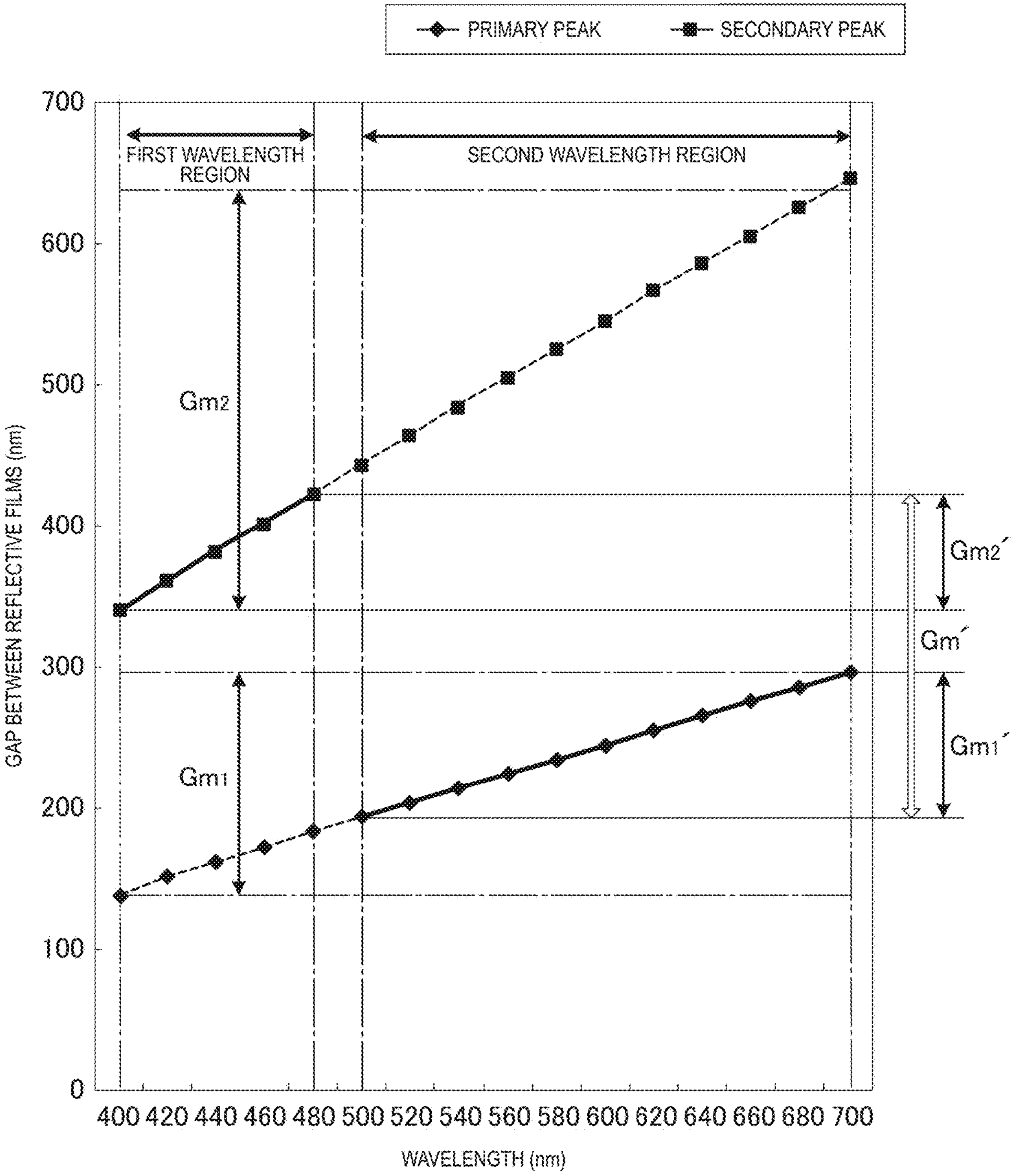
FIG. 5 is a diagram illustrating sizes of gaps between reflective films when light of each wavelength to be measured of measurement wavelength regions is extracted as light of a primary peak wavelength and a secondary peak wavelength.

FIG. 5 is a diagram illustrating sizes of gaps between reflective films when light of each wavelength to be measured of measurement wavelength regions is extracted as light of the primary peak wavelength and the secondary peak wavelength.

When the V-λ data corresponding to Table 2 is used, light of the wavelength to be measured is extracted using the secondary peak wavelength having an order of m=2 with respect to the first wavelength region of 400 nm to 480 nm, and light of the wavelength to be measured is extracted using the primary peak wavelength having an order of m=1 with respect to the second wavelength region of 500 nm to 700 nm. In this case, light of the wavelength to be measured is transmitted on the basis of transmittance characteristics as shown in FIG. 3.

That is, light of the wavelength to be measured is transmitted using the secondary peak wavelength having a higher order than that of the second wavelength region with respect to the first wavelength region having a shorter wavelength that of the second wavelength region, thereby allowing the minimum value of the gap G1 between the reflective films (gap for a wavelength of 400 nm) to be increased, for example, as compared to a case where the light of each wavelength to be measured of the measurement wavelength region (400 nm to 700 nm) is transmitted using only the primary peak wavelength.

Thereby, the gap G1 between the reflective films of the fixed reflective film 54 and the movable reflective film 55 is not excessively reduced, and thus it is possible to reduce a risk of foreign substances being interposed between the fixed reflective film 54 and the movable reflective film 55.

In addition, light of the wavelength to be measured is transmitted using the primary peak wavelength having a lower order than that of the first wavelength region with respect to the second wavelength region having a longer wavelength than that of the first wavelength region. In this case, it is possible to reduce the gap driving amount for the second wavelength region.

That is, as mentioned above, in order to reduce a risk of foreign substances being interposed between the fixed reflective film 54 and the movable reflective film 55, when the light of the each wavelength to be measured of the measurement wavelength region is transmitted using only the secondary peak wavelength, a gap driving range Gm2 of the electrostatic actuator 56 becomes 340.1 nm to 646.0 nm as shown in Table 1 and FIG. 5, and thus it is necessary to drive the movable portion 521 by 306.0 nm in order to sequentially extract light of all the wavelengths to be measured.

On the other hand, in the present embodiment, a gap driving range Gm' of the electrostatic actuator 56 becomes 340.1 nm to 423.0 nm which is a gap driving range Gm2' for the first wavelength region, and 193.6 nm to 296.1 nm which is a gap driving range Gm1' for the second wavelength region. In this case, in order to sequentially extract the light of all the wavelengths to be measured, since the amount of driving of the movable portion 521 (gap driving amount) is 229.4 nm, it is possible to reduce the driving amount as compared to the gap driving amount (306.0 nm) when only the secondary peak wavelength is used.

Generally, in the adjustment of the gap G1 between the reflective films using the electrostatic actuator 56, it is necessary to displace the movable portion 521 against a restoring force of the movable substrate 52. Therefore, when the driving amount is large, the restoring force thereof increases, which leads to difficulty in gap control. On the other hand, as mentioned above, the gap control is facilitated due to a reduction in the gap driving amount, and accordingly, the gap G1 between the reflective films can be accurately adjusted to a desired value. In addition, when the gap driving amount is large, power required for the driving also increases, but power required for the driving can also be reduced due to a reduction in the gap driving amount.

Setting of Order

In the above-mentioned example, as shown in Table 2, an example is illustrated in which the light of the first wavelength region is transmitted as the secondary peak wavelength, and the light of the second wavelength region is transmitted as the primary peak wavelength, but other orders can also be set.

For example, as shown in the following Table 3, the light of the first wavelength region may be transmitted as the tertiary peak wavelength, and the light of the second wavelength region may be transmitted as the secondary peak wavelength.

TABLE 3

| Wave-length to Be measured (nm) | Gap between Reflective Films (nm) | Order |
|---|---|---|
| 400 | 540.2 | 3 |
| 420 | 571.3 | |
| 440 | 602.0 | |
| 460 | 632.4 | |
| 480 | 662.9 | |
| 500 | 443.6 | 2 |
| 520 | 464.0 | |
| 540 | 484.3 | |
| 560 | 504.5 | |
| 580 | 524.7 | |
| 600 | 545.0 | |
| 620 | 565.3 | |
| 640 | 585.5 | |
| 660 | 605.7 | |
| 680 | 625.9 | |
| 700 | 646.0 | |

As shown in Table 3, when the light of the wavelength to be measured is transmitted using the tertiary peak wavelength with respect to the first wavelength region, and the secondary peak wavelength is used for the second wavelength region, the minimum value of the gap G1 between the reflective films becomes 443.6 nm. When the light of each wavelength to be measured of the measurement wavelength region is transmitted using only the secondary peak wavelength, the minimum value of the gap G1 between the reflective films becomes 340.1 nm, and thus the minimum value of the gap G1 between the reflective films can be further increased. Therefore, when the gap G1 between the reflective films is narrowed, it is possible to further reduce a risk of foreign substances being interposed between the fixed reflective film 54 and the movable reflective film 55.

Figure 6:
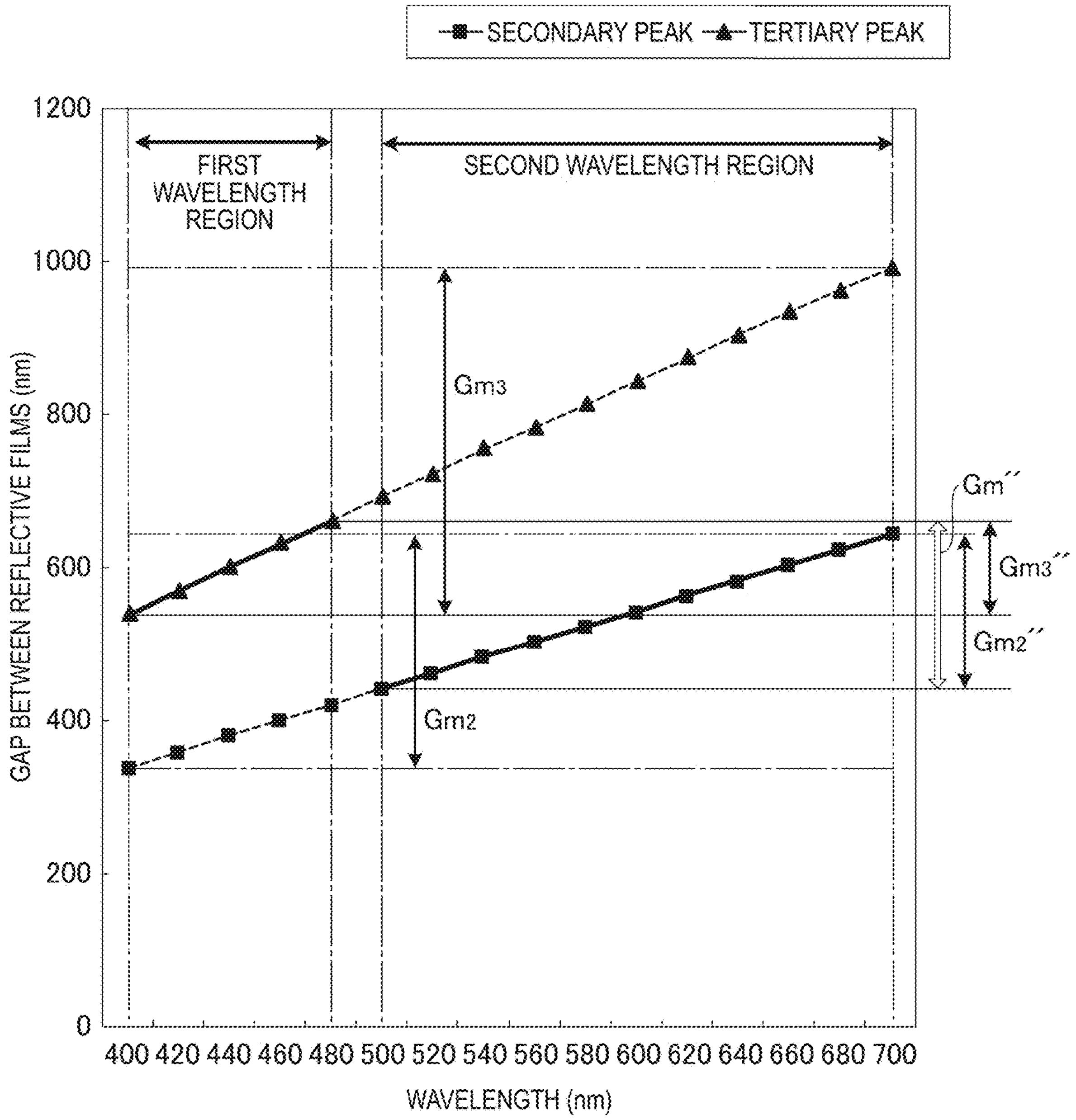
FIG. 6 is a diagram illustrating sizes of the gaps between reflective films when the light of each wavelength to be measured of the measurement wavelength regions is extracted as light of the secondary peak wavelength and a tertiary peak wavelength.

FIG. 6 is a diagram illustrating sizes of gaps between reflective films when the light of the each wavelength to be measured of the measurement wavelength regions is extracted as light of the secondary peak wavelength and the tertiary peak wavelength.

When the light of the wavelength to be measured is transmitted only using the tertiary peak wavelength, as shown in Table 1 and FIG. 6, it is necessary to perform driving by a gap driving range Gm3 from the clearance size of 996.1 nm of the gap G1 between the reflective films corresponding to the wavelength to be measured of 700 nm to the clearance size of 540.2 nm of the gap G1 between the reflective films corresponding to the wavelength to be measured of 400 nm, and the gap driving amount of the electrostatic actuator 56 becomes 455.9 nm.

On the other hand, when the light of the wavelength to be measured is transmitted using the tertiary peak wavelength with respect to the first wavelength region, and the secondary peak wavelength is used for the second wavelength region, as shown in Table 1, Table 3, and FIG. 6, the size (maximum gap in the second wavelength region) of the gap G1 between the reflective films corresponding to the longest wavelength of the wavelengths to be measured which belongs to the second wavelength region becomes larger than the size (minimum gap in the first wavelength region) of the gap G1 between the reflective films corresponding to the shortest wavelength of the wavelengths to be measured which belongs to the first wavelength region. In this case, a portion of a gap driving range Gm3" (540.2 nm to 662.9 nm) of the first wavelength region and a portion of a gap driving range Gm2" (443.6 nm to 646.0 nm) of the second wavelength region overlap each other. Therefore, the amount of light of the wavelength to be measured in the range of a portion of the second wavelength region can be acquired in the range of a portion of the gap driving range Gm3" of the first wavelength region. In such a case, a gap driving range Gm" of the electrostatic actuator 56 becomes 443.6 nm to 662.9 nm, and the gap driving amount becomes 219.3 nm. Therefore, this gap driving amount becomes smaller than the gap driving amount (455.9 nm) when the amount of light of each wavelength to be measured is acquired only using the tertiary peak wavelength.

Meanwhile, in such a case, the light of the tertiary peak wavelength within the first wavelength region and the light of the secondary peak wavelength within the second wavelength region are transmitted simultaneously. Even in such a case, in the present embodiment, the spectrum estimation process is performed by the spectroscopic measurement unit 23, and thus it is possible to estimate the high-precision optical spectrum S in which light other than the wavelength to be measured is cut.

Meanwhile, in Table 3, an example is illustrated in which the range of a portion of the gap driving range Gm2" of the second wavelength region and the range of a portion of the gap driving range Gm3" of the first wavelength region overlap each other, but the range between the first wavelength region and the second wavelength region and the order for each wavelength region may be set so that, for example, the entire gap driving range Gm2" of the second wavelength region is included in the gap driving range Gm3" of the first wavelength region. Even in this case, similarly to the above, in the overlapped gap driving range, it is possible to transmit both the light of the wavelength to be measured which belongs to the first wavelength region and the light of the wavelength to be measured which belongs to the second wavelength region, and to effectively reduce the gap driving amount.

In addition, other orders may be adopted without being limited to the examples shown in Table 2 and Table 3, and the measurement wavelength region is classified into, for example, three or more wavelength regions, so that the orders may be made different from each other with respect to each of these wavelength regions. For example, V-λ data may be set so that the light of the wavelength to be measured is transmitted using the tertiary peak wavelength with respect to the wavelength region of 400 nm to 500 nm, the light of the wavelength to be measured is transmitted using the secondary peak wavelength with respect to the wavelength region of 520 nm to 600 nm, and the light of the wavelength to be measured is transmitted using the primary peak wavelength with respect to the wavelength region of 620 nm to 700 nm.

Operations and Effects of First Embodiment

In the present embodiment, the wavelength variable interference filter 5 includes the fixed reflective film 54, the movable reflective film 55, and the electrostatic actuator 56 that changes the gap G1 between the reflective films of the reflective films 54 and 55. The gap control unit 15 controls the gap G1 between the reflective films to the clearance size for transmitting the light of the wavelength to be measured, at peak wavelengths of orders which are respectively set with respect to the first wavelength region and the second wavelength region. That is, in the present embodiment, the wavelength to be measured for transmission as a lower-order peak wavelength and the wavelength to be measured for transmission as a higher-order peak wavelength are set with respect to the light of each wavelength to be measured of the measurement wavelength region.

In such a configuration, the light of the wavelength to be measured is transmitted using a higher-order peak wavelength having a higher order, thereby allowing the gap G1 between the reflective films to be increased, as compared to a case where the light of the wavelength to be measured is transmitted using a lower-order peak wavelength having a lower order. For this reason, it is possible to reduce a risk of foreign substances being interposed between the reflective films 54 and 55, and to suppress the generation of malfunction due to this. In addition, the gap G1 between the reflective films is sufficiently increased depending on the wavelength to be measured, and thus there may be a low possibility of foreign substances being interposed between the reflective films 54 and 55. Even in such a case, when a higher-order peak wavelength is used, it is difficult to control the electrostatic actuator 56. On the other hand, in the present embodiment, since the light of the wavelength to be measured is transmitted using a lower-order peak wavelength with respect to such a wavelength to be measured, it is possible to reduce the gap driving amount of the electrostatic actuator 56, and to improve the accuracy of gap control, for example, as compared to a case where the light of the each wavelength to be measured of the measurement wavelength region is transmitted using only a higher-order peak wavelength.

In the present embodiment, the V-λ data in which a voltage for the wavelength to be measured is recorded is stored in the storage unit 16. In the V-λ data, an order is set in advance with respect to the wavelength to be measured, and a voltage for transmitting the wavelength to be measured using a peak wavelength corresponding to the order is recorded in association with the wavelength to be measured.

For this reason, the gap control unit 15 reads a voltage value, corresponding to the wavelength to be measured, from the V-λ data, and just applies a voltage corresponding to the voltage value to the electrostatic actuator 56, thereby allowing the size of the gap G1 between the reflective films to be controlled to a size corresponding to an order which is set in accordance with the wavelength to be measured.

In the present embodiment, the gap control unit 15 causes the light of the wavelength to be measured which belongs to the first wavelength region (for example, 400 nm to 480 nm) located at the short wavelength side of the measurement wavelength region to be transmitted as the secondary peak wavelength, and causes the light of the wavelength to be measured which belongs to the second wavelength region (for example, 500 nm to 700 nm) located at the long wavelength side to be transmitted as the primary peak wavelength.

For this reason, on the short wavelength side at which the clearance size of gap G1 between the reflective films is further reduced, the clearance size can be increased, and thus the interposition of foreign substances between the reflective films 54 and 55 can be effectively suppressed. Further, on the long wavelength region, the secondary peak wavelength is used, and thus it is possible to reduce the gap driving amount by the electrostatic actuator 56, and to achieve an improvement in control of the gap control.

In the present embodiment, as shown in Table 3, the clearance size of the gap G1 between the reflective films for the longest wavelength of the wavelength to be measured which belongs to the second wavelength region may be set to be larger than the clearance size of the gap G1 between the reflective films for the shortest wavelength of the wavelength to be measured which belongs to the first wavelength region.

In such a case, at least a portion of the gap driving range for the first wavelength region and at least a portion of the gap driving range for the second wavelength region overlap each other. For example, as shown in Table 3 mentioned above, when the light of the wavelength to be measured of the first wavelength region is transmitted as the tertiary peak wavelength, and the light of the wavelength to be measured of the second wavelength region is transmitted as the secondary peak wavelength, a portion of the gap driving range (545.0 nm to 646.0 nm) for the second wavelength region overlaps the gap driving range (540.2 nm to 662.9 nm) for the first wavelength region.

Therefore, in the overlapped driving range, it is possible to transmit both the wavelength to be measured of the first wavelength region and the wavelength to be measured of the second wavelength region, and to further reduce the gap driving amount of the electrostatic actuator 56. For example, as shown in Table 1 mentioned above, when the light of each wavelength to be measured is transmitted only using the tertiary peak wavelength, as shown in Table 1, it is necessary to perform driving by 455.9 nm from 996.1 nm corresponding to the wavelength to be measured of 700 nm to 540.2 nm corresponding to the wavelength to be measured of 400 nm. On the other hand, in the present embodiment, as shown in Table 3, it is also possible to transmit the light of each wavelength to be measured, during the driving by 219.3 nm from 662.9 nm corresponding to the wavelength to be measured of 480 nm to 443.6 nm corresponding to the wavelength to be measured of 500 nm.

In the present embodiment, the voltage control unit 17 of the gap control unit 15 reads a voltage value for each wavelength to be measured in step S2, and then sorts the read voltage values in step S3 in ascending order, and the voltages are sequentially applied to the electrostatic actuator 56 in sorting order.

For this reason, the gap G1 between the reflective films is sequentially narrowed in a direction in which the clearance size decreases from an initial gap, and the movable portion 521 is driven by one stroke, thereby allowing the amount of light for each wavelength to be measured to be acquired.

In the spectrometer 1 of the present embodiment, the spectroscopic measurement unit 23 estimates the optical spectrum S of measurement light reflected from the measuring object X by causing the estimation matrix Ms to act on the measurement spectrum D based on the amount of light for the obtained multiple wavelengths to be measured.

Such an estimation matrix Ms is a matrix which is set so that a deviation between the optical spectrum S0 and the inner product of the measurement spectrum D0 and the estimation matrix Ms is minimized on the basis of the measurement spectrum D0 obtained by measuring reference light (sample light) of which the optical spectrum S0 is known using the spectrometer 1, and the optical spectrum S0. Therefore, even when noise components (for example, light of other peak wavelengths) other than the light of the wavelength to be measured are included in light passing through the wavelength variable interference filter 5, it is possible to estimate the high-precision optical spectrum S by causing the estimation matrix Ms to act on the measurement spectrum D.

Second Embodiment

Next, a second embodiment of the invention will be described below.

In the above-mentioned first embodiment, the gap control unit 15 sets V-λ data so that the orders of the used peak wavelength are different from each other, in accordance with the wavelength to be measured, applies a voltage corresponding to the wavelength to be measured to the electrostatic actuator 56 on the basis of the V-λ data. On the other hand, the present embodiment is different from the above-mentioned first embodiment, in that the gap control unit selects an order in accordance with the wavelength to be measured, and controls the electrostatic actuator 56 so as to be set to the gap G1 between the reflective films corresponding to the selected order.

Figure 7:
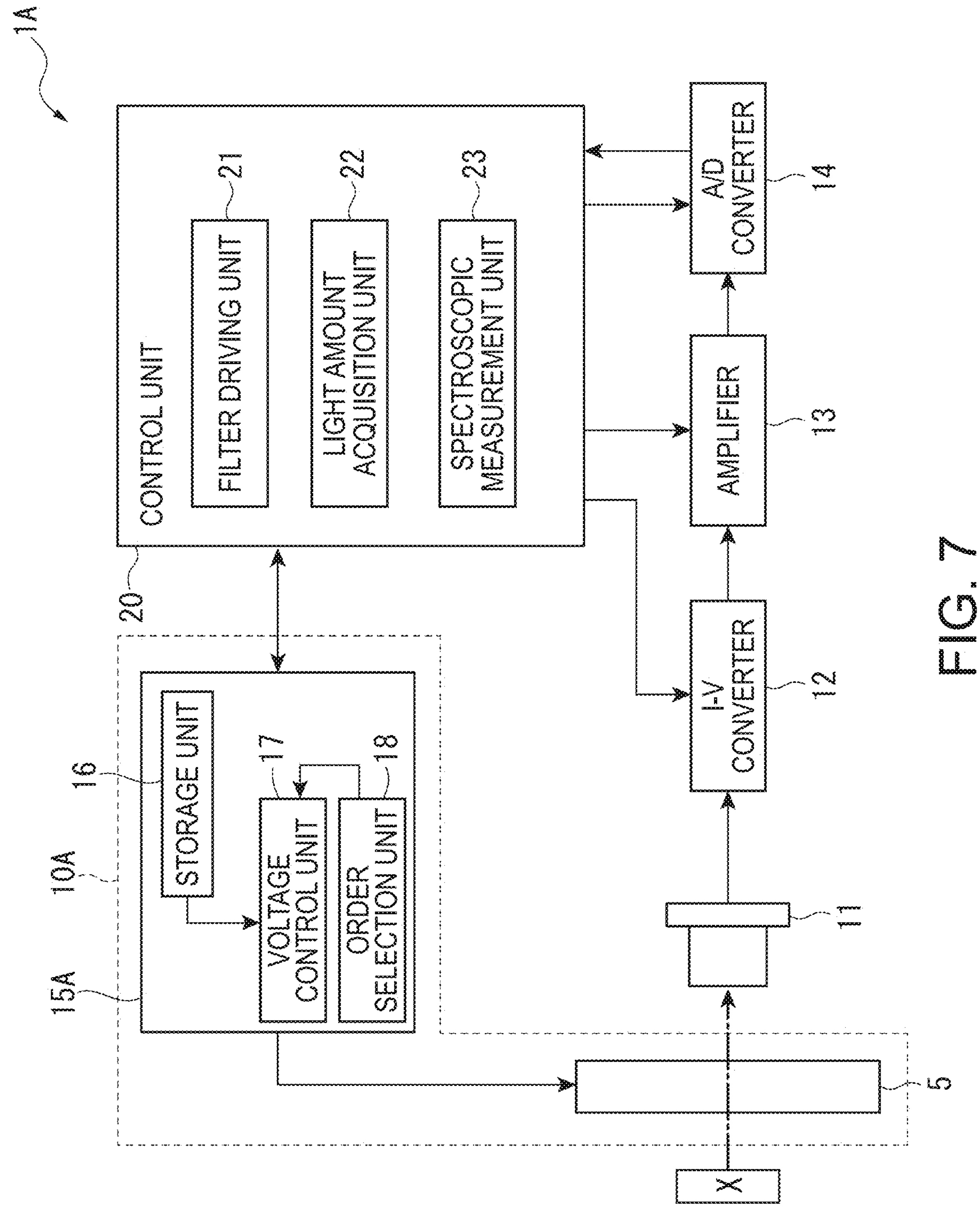
FIG. 7 is a block diagram illustrating a schematic configuration of a spectrometer according to a second embodiment of the invention.

FIG. 7 is a block diagram illustrating a schematic configuration of a spectrometer 1A according to the second embodiment.

As shown in FIG. 7, an optical module 10A of the spectrometer 1A according to the present embodiment includes the wavelength variable interference filter 5 and a gap control unit 15A. In addition, the gap control unit 15A includes the storage unit 16, the voltage control unit 17, and an order selection unit 18.

Here, V-λ data indicating a voltage corresponding to a gap when the light of each wavelength to be measured is transmitted from the wavelength variable interference filter 5 using the peak wavelength of each order is stored in the storage unit 16 of the present embodiment. That is, the voltage for each clearance size of the gap G1 between the reflective films shown in Table 1 mentioned above is recorded therein. For example, regarding a wavelength λ1 to be measured, recorded are a voltage for extracting light of the wavelength λ1 to be measured as a primary peak wavelength, a voltage for extracting light of the wavelength 11 to be measured as a secondary peak wavelength, a voltage for extracting light of the wavelength 11 to be measured as a tertiary peak wavelength, a voltage for extracting light of the wavelength λ1 to be measured as a quartic peak wavelength, and the like.

The order selection unit 18 selects an order corresponding to the wavelength to be measured.

The voltage control unit 17 reads a wavelength to be measured and a voltage value which corresponds to the order selected by the order selection unit 18 from the V-λ data stored in the storage unit 16, and applies a voltage corresponding to the read voltage value to the electrostatic actuator 56.

Order Selection Process of Order Selection Unit 18

In the present embodiment, as mentioned above, an order for each wavelength region can be selected by the order selection unit 18.

Here, the order selected by the order selection unit 18 may be set in advance by each wavelength to be measured, and may be able to be appropriately set by, for example, a measurer. In addition, the order may be set in accordance with conditions (for example, atmospheric pressure, temperature and the like) such as an environment in which the wavelength variable interference filter 5 is installed.

When the order is set by a measurer, the order is acquired on the basis of, for example, an input operation of an operation unit which is not shown.

In addition, when ambient atmospheric pressure, temperature and the like are set as the conditions such as an environment, the spectrometer 1A is configured to include an environmental measurement device such as a barometer or a thermometer. When a value measured by the environmental measurement device exceeds, for example, a threshold which is set in advance, a process of increasing an order which is set as an initial value by "1" may be performed.

Further, the order selection unit 18 selects an order depending on a variation during the manufacturing of the wavelength variable interference filter 5.

That is, in the wavelength variable interference filter 5, the initial size of the gap G1 between the reflective films in an initial state in which a voltage is not applied to the electrostatic actuator 56 has a manufacturing variation. For this reason, in the related art, considering the variation of the initial size at the time of the manufacturing, the measurement start size when the measurement is started is required to be set so as to be smaller than the initial size. That is, when the initial size is larger than the measurement start size, first, it is necessary to displace the movable portion 521 by applying a voltage to the electrostatic actuator 56 until the gap G1 between the reflective films is equal to the measurement start size, which leads to a problem of an increase in the driving amount. In addition, when the initial size is smaller than the measurement start size, it is not possible to widen the gap G1 between the reflective films by the electrostatic actuator 56, and thus there is a problem in that the measurement of the wavelength to be measured which corresponds to the measurement start size cannot be performed.

On the other hand, in the present embodiment, the order selection unit 18 selects a measurement start wavelength in accordance with the initial size at the time of the manufacturing. Thereby, an appropriate order is selected with respect to the wavelength to be measured, and thus it is possible to extract light of wavelength to be measured regardless of the initial size, and to suppress an increase in the driving amount.

Hereinafter, by way of a specific example, a description will be made of an order selection method of the order selection unit 18 for coping with the variation of the initial size occurring in the manufacturing of the wavelength variable interference filter 5.

When the initial size is set to 450 nm, 430 nm, and 410 nm in the spectrometer 1 of the above-mentioned first embodiment, Table 4 shown below is a table indicating whether the measurement of the wavelength region of 400 nm to 700 nm can be performed, or the gap driving amount when the measurement can be performed.

TABLE 4

| Initial Size | Possibility of Measurement | Gap Driving Amount |
|---|---|---|
| 450 nm | Possible | 256.4 nm |
| 430 nm | Possible | 236.4 nm |
| 410 nm | Impossible | — |

When the V-λ data corresponding to Table 2 is used, the measurement start size becomes 423.0 nm corresponding to the wavelength to be measured of 480 nm. Therefore, as shown in Table 4, when the initial size is 410 nm, light of the wavelength to be measured of 480 nm is not extracted as the secondary peak wavelength, and the measurement cannot be performed. In addition, when the initial gap is 450 nm, first, the gap G1 between the reflective films is driven from the initial size to 423.0 nm which is the measurement start size, and then is required to be changed to the clearance size corresponding to each wavelength to be measured. Accordingly, the gap driving amount increases.

Table 5 is a table indicating whether the measurement of the wavelength region of 400 nm to 700 nm can be performed when the initial size is set to 450 nm, 430 nm, and 410 nm in the present embodiment, or the gap driving amount when the measurement can be performed. In addition, Table 6 is a table indicating orders selected by the order selection unit 18 when the initial size is 450 nm, Table 7 is a table indicating orders selected by the order selection unit 18 when the initial size is 430 nm, and Table 8 is a table indicating orders selected by the order selection unit 18 when the initial size is 410 nm.

TABLE 5

| Initial Size | Possibility of Measurement | Gap Driving Amount |
|---|---|---|
| 450 nm | Possible | 246.0 nm |
| 430 nm | Possible | 236.4 nm |
| 410 nm | Possible | 226.9 nm |

TABLE 6

| Wave-length to Be measured (nm) | Gap between Reflective Films (nm) | Order |
|---|---|---|
| 400 | 340.1 | 2 |
| 420 | 361.2 | |
| 440 | 381.9 | |
| 460 | 402.5 | |
| 480 | 423.0 | |
| 500 | 443.6 | |
| 520 | 204.0 | 1 |
| 540 | 214.3 | |
| 560 | 224.6 | |
| 580 | 234.8 | |
| 600 | 245.1 | |
| 620 | 255.4 | |
| 640 | 265.6 | |
| 660 | 275.8 | |
| 680 | 285.9 | |
| 700 | 296.1 | |

TABLE 7

| Wave-length to Be measured (nm) | Gap between Reflective Films (nm) | Order |
|---|---|---|
| 400 | 340.1 | 2 |
| 420 | 361.2 | |
| 440 | 381.9 | |
| 460 | 402.5 | |
| 480 | 423.0 | |
| 500 | 193.6 | 1 |
| 520 | 204.0 | |
| 540 | 214.3 | |
| 560 | 224.6 | |
| 580 | 234.8 | |
| 600 | 245.1 | |
| 620 | 255.4 | |
| 640 | 265.6 | |
| 660 | 275.8 | |
| 680 | 285.9 | |
| 700 | 296.1 | |

TABLE 8

| Wave-length to Be measured (nm) | Gap between Reflective Films (nm) | Order |
|---|---|---|
| 400 | 340.1 | 2 |
| 420 | 361.2 | |
| 440 | 381.9 | |
| 460 | 402.5 | |
| 480 | 183.1 | 1 |
| 500 | 193.6 | |
| 520 | 204.0 | |
| 540 | 214.3 | |
| 560 | 224.6 | |
| 580 | 234.8 | |
| 600 | 245.1 | |
| 620 | 255.4 | |
| 640 | 265.6 | |
| 660 | 275.8 | |
| 680 | 285.9 | |
| 700 | 296.1 | |

In the present embodiment, when the initial size of the gap G1 between the reflective films is 430 nm, as shown in Table 7, the order selection unit 18 selects an order "2" by setting 400 nm to 480 nm to the first wavelength region, and selects an order "1" by setting 500 nm to 700 nm to the second wavelength region. That is, the orders similar to those of Table 2 are selected. In this case, the gap driving amount similar to that of the first embodiment is set.

On the other hand, when the initial size is 450 nm in the present embodiment, as shown in Table 6, the order selection unit 18 selects an order "2" by setting 400 nm to 500 nm to the first wavelength region, and selects an order "1" by setting 520 nm to 700 nm to the second wavelength region. That is, the light of the wavelength to be measured within the first wavelength region (400 nm to 500 nm) is extracted as the secondary peak wavelength, and the light of the wavelength to be measured within the second wavelength region (520 nm to 700 nm) is extracted as the primary peak wavelength. In this case, unlike the pattern of Table 2, the light of the wavelength to be measured of 500 nm is extracted as the secondary peak wavelength.

In the spectrometer 1 of the above-mentioned first embodiment, when the initial size is 450 nm, first, driving is required by 27.0 nm until the measurement start size of 423.0 nm. However, in the present embodiment, the gap G1 between the reflective films is driven by 6.4 nm from 450 nm which is the initial size to 443.6 nm corresponding to the wavelength to be measured of 500 nm, and then may be changed to a size corresponding to each wavelength to be measured. Therefore, as shown in Table 5, the gap driving amount becomes 246.0 nm, and becomes smaller than the gap driving amount (256.4 nm) when the spectrometer 1 of the first embodiment is used.

In addition, in the spectrometer 1 of the first embodiment, when the initial size of the gap G1 between the reflective films is 410 nm, the light of the wavelength to be measured of 480 nm cannot be extracted, and the measurement cannot be performed. On the other hand, in the present embodiment, when the initial size is 410 nm, as shown in Table 8, the order selection unit 18 selects an order "2" by setting 400 nm to 460 nm to the first wavelength region, and selects an order "1" by setting 480 nm to 700 nm to the second wavelength region. Thereby, even when the initial size is 410 nm, it is possible to extract the light of each wavelength to be measured of the measurement wavelength region of 400 nm to 700 nm. In addition, in this case, the gap driving amount becomes 226.9 nm.

As mentioned above, in the present embodiment, the order is selected by the order selection unit 18, thereby allowing a margin to be provided in the measurement start gap. Therefore, even when a variation occurs in the initial size at the time of manufacturing the wavelength variable interference filter 5, an optimum order is selected in accordance with the initial size, thereby allowing the light of each wavelength to be measured within a predetermined measurement wavelength region to be appropriately extracted. In addition, it is possible to reduce the gap driving amount, and to improve the accuracy of the gap control of the electrostatic actuator 56.

Spectrometric Process of Spectrometer 1A

The spectrometer 1A of the present embodiment performs a spectrometric operation by substantially the same method as that in the above-mentioned first embodiment.

Here, in the present embodiment, in step S2 of FIG. 3, the order selection unit 18 of the gap control unit 15A selects an order for each wavelength region.

In the selection of the order, it is possible to select the order under the conditions as mentioned above.

For example, the first wavelength region and the second wavelength region are set in accordance with the initial size, and the orders are selected with respect to the first wavelength region and the second wavelength region, respectively. In this case, in order to detect the initial size, a capacitance detection electrode may be provided, for example, between the fixed substrate 51 and the movable substrate 52.

In addition, as mentioned above, the order to be selected may be changed in accordance with a measurer's operation or the like. In this case, the order selection unit 18 can select an order which is freely used in the measurement in accordance with an input operation of the operation unit, for example, can select an order m=3 with respect to the first wavelength region, and also select an order m=2 with respect to the second wavelength region. Besides, when a sensor that detects an installation environment or the like of the wavelength variable interference filter 5 is provided, the order selection unit 18 may select an order in accordance with the environment detected by the sensor.

Thereafter, the voltage control unit 17 reads a voltage corresponding to the order selected by the order selection unit 18, from the V-λ data, with respect to each wavelength to be measured.

Regarding the subsequent processes, similarly to the above-mentioned first embodiment, processes of step S3 to step S7 are performed.

Operations and Effects of Second Embodiment

In the present embodiment, the gap control unit 15A includes the order selection unit 18 and the voltage control unit 17, the order selection unit 18 selects an order according to the wavelength to be measured, and the voltage control unit 17 applies a voltage according to the selected order to the electrostatic actuator 56.

In this case, similarly to the above-mentioned first embodiment, in the wavelength variable interference filter 5, light can be transmitted using the peak wavelength of an appropriate order in accordance with the wavelength to be measured. That is, the clearance size of the gap G1 between the reflective films is reduced, and thus it is possible to reduce a risk or the like of foreign substances being interposed between the reflective films 54 and 55, and to improve the accuracy of the gap control of the electrostatic actuator 56 as compared to a case where the entire wavelength to be measured is transmitted only using a higher-order peak wavelength.

In addition, in the present embodiment, since the voltage when the light of each wavelength to be measured is transmitted using each peak wavelength is stored in the V-λ data, and an order can be selected by the order selection unit 18, the order can also be appropriately changed during the measurement.

When the measurement is performed, for example, using the primary peak wavelength with respect to the first wavelength region, and a disadvantage of foreign substances being interposed, for example, between the reflective films 54 and 55 occurs, it is also possible to perform an operation in which the order for the first wavelength region is changed to a secondary order.

As mentioned above, the order selection unit 18 sets appropriate wavelength regions (first wavelength region and second wavelength region) and selects an order with respect to each wavelength region, in accordance with the initial size of the gap G1 between the reflective films. Thereby, even when a variation occurs in the initial size of the wavelength variable interference filter 5 at the time of the manufacturing, it is possible to appropriately extract the light of each wavelength to be measured within the measurement wavelength region (for example, 400 nm to 700 nm). In addition, since the gap driving amount can be reduced, it is possible to improve the accuracy of the gap control of the electrostatic actuator 56.

Further, in the present embodiment, the light amount measurement can be performed using a plurality of orders with respect to each wavelength to be measured.

In this case, for example, in a first measurement, the light amount measurement using the secondary peak wavelength with respect to the first wavelength region and the light amount measurement using the primary peak wavelength with respect to the second wavelength region are performed, and the estimation of the optical spectrum based on the amount of light (measurement spectrum) is performed. Thereafter, in a second measurement, the light amount measurement using the tertiary peak wavelength with respect to the first wavelength region and the light amount measurement using the secondary peak wavelength with respect to the second wavelength region are performed, and the estimation of the optical spectrum based on the amount of light (measurement spectrum) is performed. Based on the optical spectrum estimated at the first time and the optical spectrum estimated at the second time, for example, the average thereof is adopted, and thus a process of forming an optical spectrum to be measured may be performed.

Other Embodiments

Meanwhile, the invention is not limited to the above-mentioned embodiment, changes, modifications and the like within the range capable of achieving the object of the invention are included in the invention.

For example, the above-mentioned first and second embodiments, the measurement wavelength region is set to 400 nm to 700 nm, the first wavelength region is set to 400 nm to 600 nm, and the second wavelength region is set to 620 nm to 700 nm, but the embodiments are not limited thereto. For example, the first wavelength region may be set to 400 nm to 480 nm, the second wavelength region may be set to 500 nm to 700 nm, and the ranges of the first wavelength region and the second wavelength region can be appropriately set. By narrowing the short wavelength side (first wavelength region) for extracting the light of the wavelength to be measured using a higher-order peak wavelength, it is possible to further reduce the gap driving range, and to reduce the gap driving amount by the electrostatic actuator 56, thereby allowing the accuracy of the gap control to be improved. Reversely, by widening the first wavelength region for extracting the light of the wavelength to be measured using the higher-order peak wavelength, it is possible to more effectively prevent the interposition of foreign substances between the reflective films 54 and 55, and the disadvantage due to this.

In addition, as the measurement wavelength region, a wider range may be used, and a narrower range may be used.

In the above-mentioned first and second embodiments, after a voltage corresponding to each wavelength to be measured is acquired in step S2, the voltages are sorted in ascending order in step S3, and are sequentially applied to the electrostatic actuator 56, but the embodiments are not limited thereto. For example, in step S2, a process of applying the voltages in order in which the voltages for the wavelength to be measured are read, that is, in order of the wavelengths to be measured may be performed.

In the above-mentioned embodiment, as the gap change portion of the invention, the electrostatic actuator 56 constituted by the fixed electrode 561 and the movable electrode 562 is illustrated, but is not limited thereto.

For example, as the gap change portion, an inductive actuator constituted by a first inductive coil provided in the fixed substrate and a second inductive coil or a permanent magnet provided in the movable substrate may be used.

Further, a piezoelectric actuator may be used instead of the electrostatic actuator 56. In this case, for example, a lower electrode layer, a piezoelectric film, and an upper electrode layer are laminated on the holding portion 522, and a voltage applied between the lower electrode layer and the upper electrode layer is made available as an input value, thereby allowing the holding portion 522 to be bent by expanding and contracting the piezoelectric film.

Further, a configuration or the like in which the size of the gap G1 between the reflective films is adjusted can also be used, for example, by changing air pressure between the fixed substrate 51 and the movable substrate 52, without being limited to the configuration in which the size (clearance size) of the gap G1 between the reflective films is changed by voltage application. In this case, it is possible to use data in which air pressure for the wavelength to be measured is recorded instead of the V-λ data. That is, as the configuration in which the size of the gap G1 between the reflective films is changed, any configuration may be used. Parameters (for example, voltage value when the gap change portion is a voltage driving type, atmospheric pressure when the gap change portion is an air pressure driving type, and the like) for setting the gap used to extract the wavelength to be measured as the peak wavelength of a predetermined order are recorded in the storage unit 16, with respect to the wavelength to be measured.

In addition, as the electronic device of the invention, the spectrometer 1 is illustrated in each of the above-mentioned embodiment. However, besides, the optical module and the electronic device of the embodiment of the invention can be applied in various fields.

Figure 8:
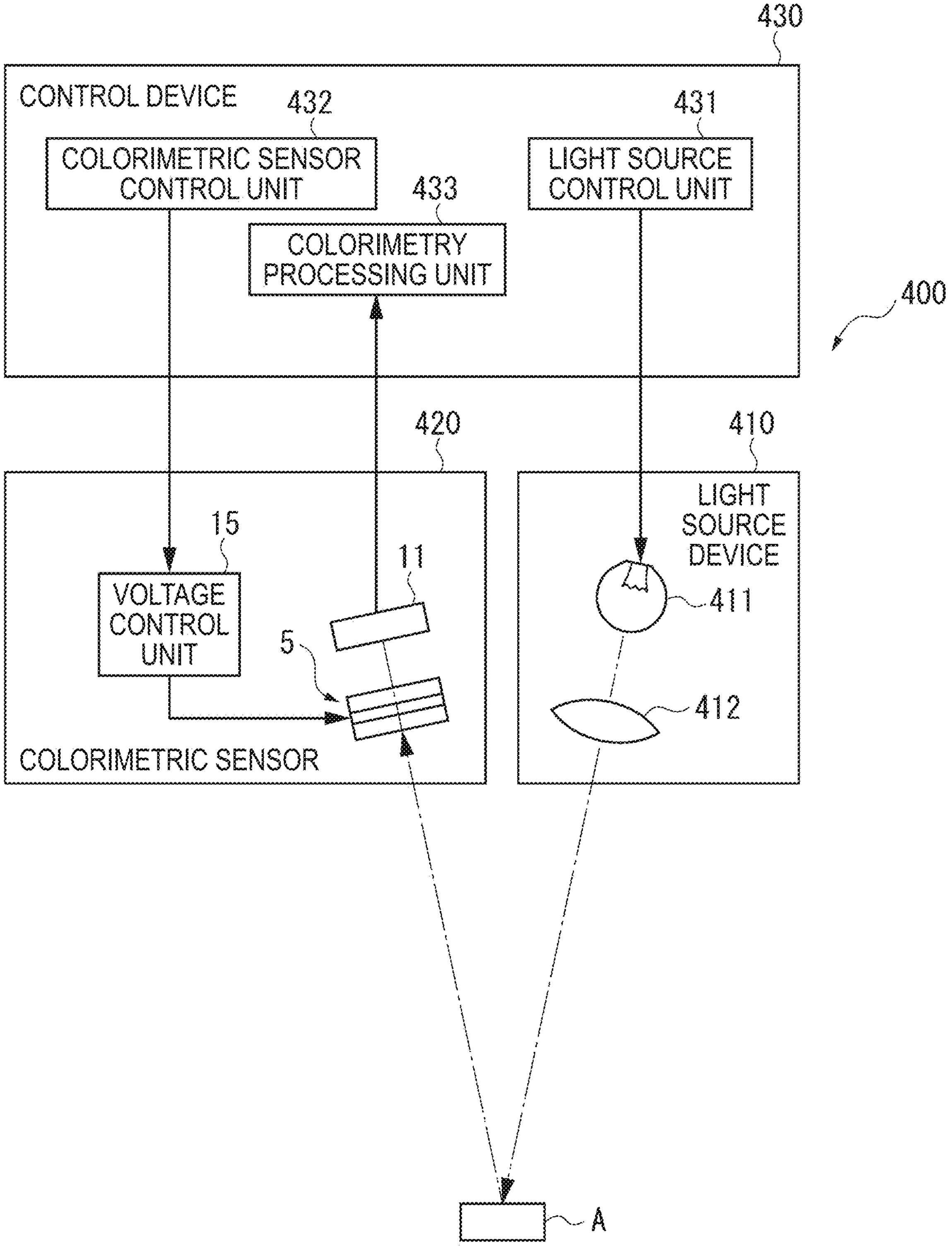
FIG. 8 is a block diagram illustrating a colorimeter which is an example of an electronic device of the invention.

For example, as shown in FIG. 8, the electronic device of the embodiment of the invention can also be applied to a colorimeter for measuring a color.

FIG. 8 is a block diagram illustrating an example of a colorimeter 400 including a wavelength variable interference filter.

As shown in FIG. 8, the colorimeter 400 includes a light source device 410 that emits light to a test object A, a colorimetric sensor 420 (optical module), and a control device 430 (processing unit) that controls the entire operation of the colorimeter 400. The colorimeter 400 is a device that reflects light emitted from the light source device 410 in the test object A, receives the reflected light to be tested in the colorimetric sensor 420, and analyzes and measures the chromaticity of the light to be tested, that is, the color of the test object A, on the basis of a detection signal which is output from the colorimetric sensor 420.

Including the light source device 410, a light source 411, and a plurality of lenses 412 (only one is shown in FIG. 8), for example, reference light (for example, white light) is emitted to the test object A. In addition, a collimator lens may be included in the plurality of lens 412. In this case, the light source device 410 changes the reference light emitted from the light source 411 to parallel light using the collimator lens, and emits the parallel light from a projection lens, not shown, toward the test object A. Meanwhile, in the present embodiment, the colorimeter 400 including the light source device 410 is illustrated, but when the test object A is, for example, a light-emitting member such as a liquid crystal panel, the light source device 410 may not be provided.

As shown in FIG. 8, the colorimetric sensor 420 includes the wavelength variable interference filter 5, the detector 11 that receives light passing through the wavelength variable interference filter 5, and the gap control unit 15 that controls a voltage applied to the electrostatic actuator 56 of the wavelength variable interference filter 5. In addition, the colorimetric sensor 420 includes an incident optical lens, not shown, which guides reflected light (light to be tested) reflected from the test object A into the inside, at a position facing the wavelength variable interference filter 5. The colorimetric sensor 420 spectroscopically disperses light of a predetermined wavelength out of the light to be tested which is incident from the incident optical lens by the wavelength variable interference filter 5, and receives the spectroscopically dispersed light in the detector 11.

The control device 430 controls the entire operation of the colorimeter 400.

As the control device 430, for example, a general-purpose personal computer, a portable information terminal, other special computers for colorimetry, or the like can be used. As shown in FIG. 8, the control device 430 includes a light source control unit 431, a colorimetric sensor control unit 432, a colorimetry processing unit 433, and the like.

The light source control unit 431 is connected to the light source device 410, outputs a predetermined control signal to the light source device 410, for example, on the basis of a user's setting input, and emits white light of predetermined brightness.

The colorimetric sensor control unit 432 is connected to the colorimetric sensor 420, sets the wavelength of light received by the colorimetric sensor 420, for example, on the basis of a user's setting input, and outputs a command signal for detecting the amount of received light of the wavelength to the colorimetric sensor 420. Thereby, the gap control unit 15 of the colorimetric sensor 420 applies a voltage to the electrostatic actuator 56 on the basis of the control signal, and drives the wavelength variable interference filter 5.

The colorimetry processing unit 433 is a processing control unit according to the invention, and analyzes the chromaticity of the test object A from the amount of received light detected by the detector 11. In addition, similarly to the first and the second embodiments mentioned above, the colorimetry processing unit 433 may analyze the chromaticity of the test object A by using the amount of light obtained by the detector 11 as the measurement spectrum D, and estimating the optical spectrum S using the estimation matrix Ms.

In addition, another example of the electronic device according to the invention includes a light-based system for detecting the presence of a specific substance. As such a system, for example, a spectroscopic measurement system using a wavelength variable interference filter is adopted, and a gas leak detector for a vehicle that detects a specific gas with a high degree of sensitivity, or a gas detector such as a photoacoustic rare gas detector for a breath test can be used.

An example of such a gas detector will be described below with reference to the accompanying drawings.

Figure 9:
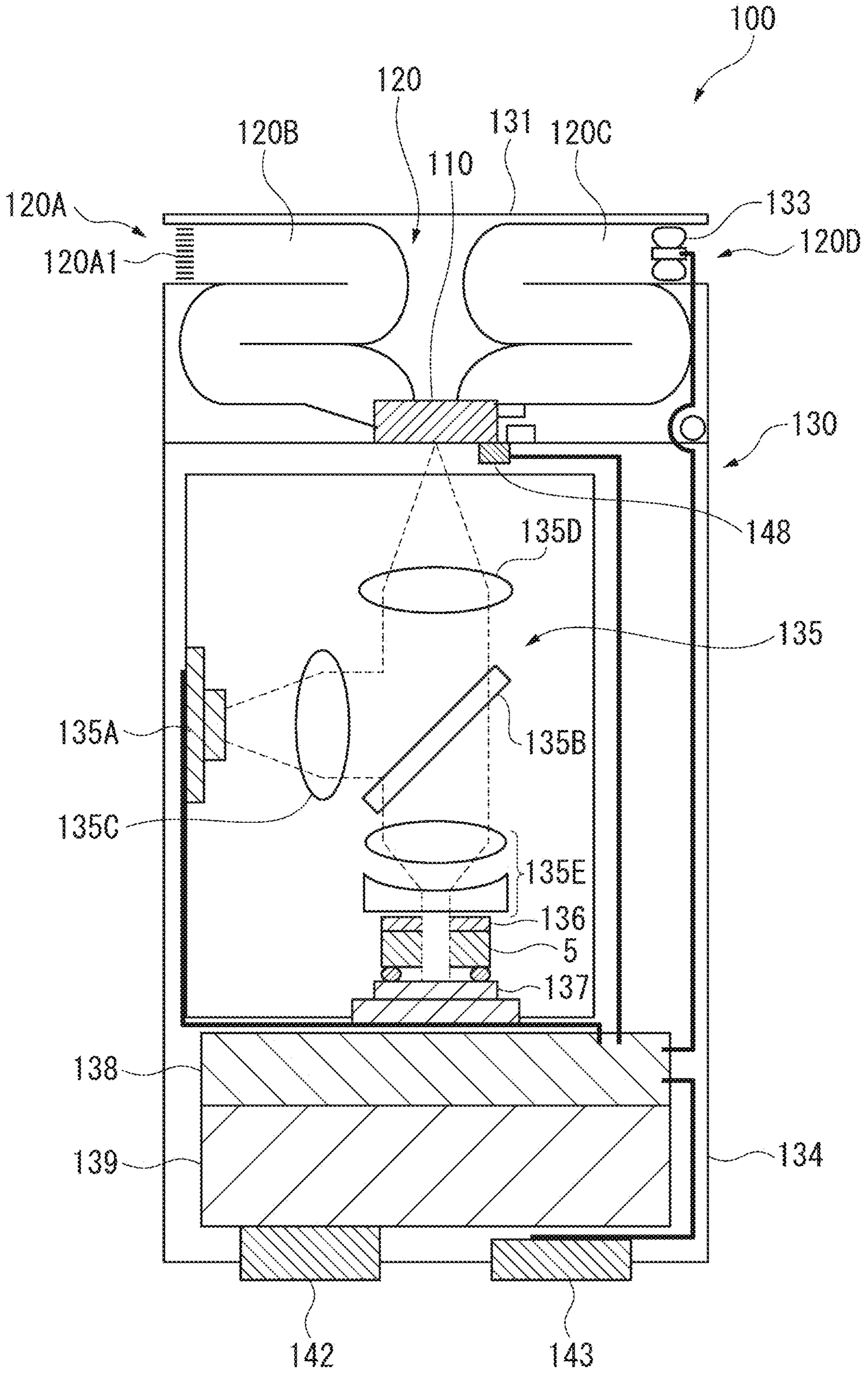
FIG. 9 is a schematic diagram illustrating a gas detector which is an example of an electronic device of the invention.

FIG. 9 is a schematic diagram illustrating an example of a gas detector including a wavelength variable interference filter.

Figure 10:
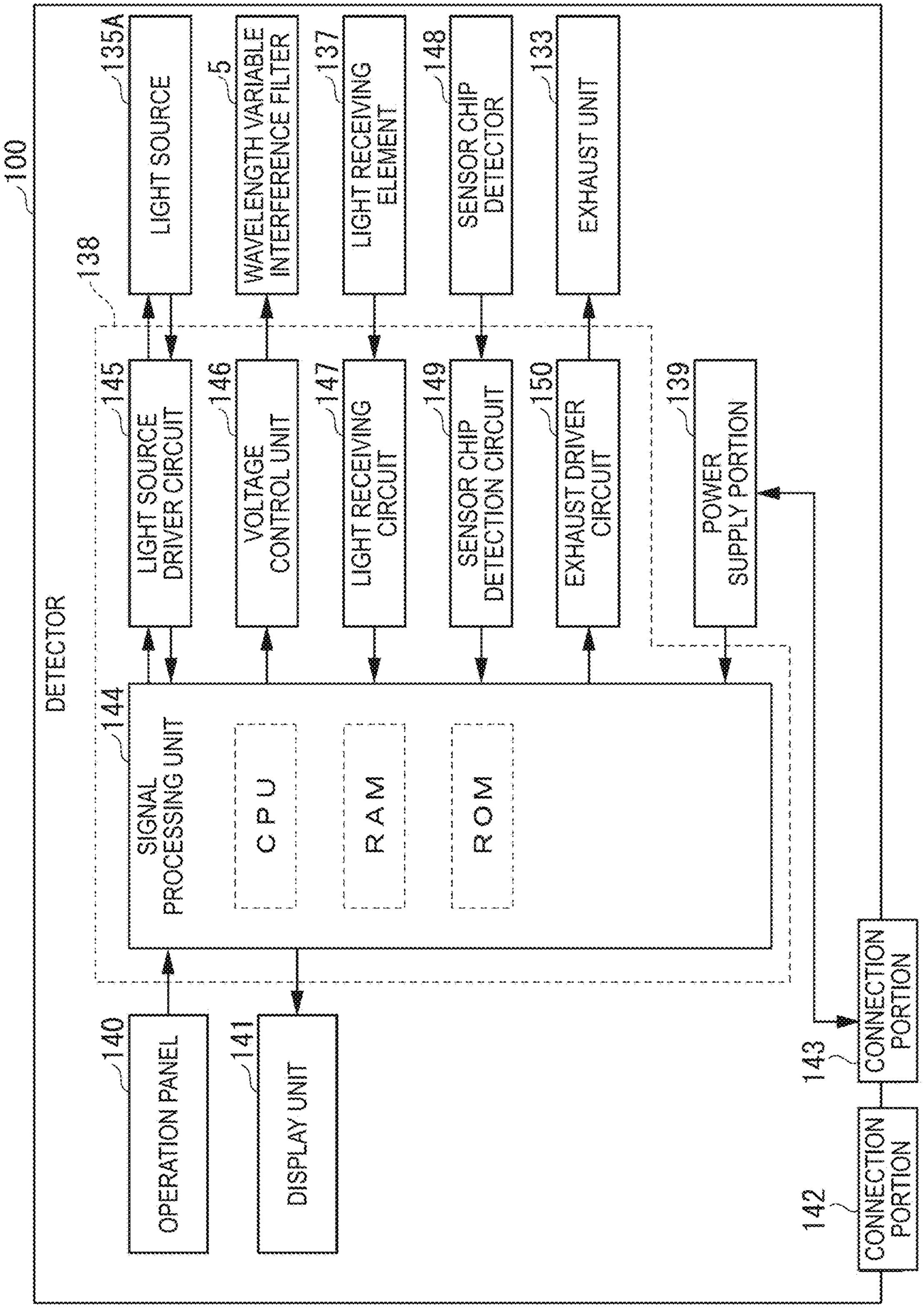
FIG. 10 is a block diagram illustrating a configuration of a control system of the gas detector of FIG. 9.

FIG. 10 is a block diagram illustrating a configuration of a control system of the gas detector of FIG. 9.

As shown in FIG. 9, the gas detector 100 includes a sensor chip 110, a flow channel 120 provided with a suction port 120A, a suction flow channel 120B, an exhaust flow channel 120C, and an exhaust port 120D, and a main body 130.

The main body 130 is constituted by a detector including a sensor cover 131 having an opening capable of attaching and detaching the flow channel 120, an exhaust unit 133, a housing 134, an optical portion 135, a filter 136, a wavelength variable interference filter 5, a light receiving element 137 (detection unit) and the like, a control unit 138 that processes a detected signal and controls the detection unit, a power supply portion 139 that supplies power, and the like. In addition, the optical portion 135 is constituted by a light source 135A that emits light, a beam splitters 135B that reflects light incident from the light source 135A to the sensor chip 110 side and transmits light incident from the sensor chip side to the light receiving element 137 side, and lenses 135C, 135D, and 135E.

In addition, as shown in FIG. 10, the surface of the gas detector 100 is provided with an operation panel 140, a display unit 141, a connection portion 142 for an interface with the outside, and a power supply portion 139. When the power supply portion 139 is a secondary battery, a connection portion 143 for charge may be included.

Further, as shown in FIG. 10, the control unit 138 of the gas detector 100 includes a signal processing unit 144 constituted by a CPU and the like, a light source driver circuit 145 for controlling the light source 135A, a voltage control unit 146 for controlling the wavelength variable interference filter 5, a light receiving circuit 147 that receives a signal from the light receiving element 137, a sensor chip detection circuit 149 that receives a signal from a sensor chip detector 148 for reading a code of the sensor chip 110 and detecting the presence or absence of the sensor chip 110, an exhaust driver circuit 150 that controls the exhaust unit 133, and the like. In addition, the gas detector 100 includes a storage unit (not shown) that stores the V-λ data. Meanwhile, the gap control unit is constituted by the voltage control unit 146 and the storage unit, such as a RAM and a ROM, of the signal processing unit 144, and the voltage control unit 146 controls a voltage applied to the electrostatic actuator 56 of the wavelength variable interference filter 5 on the basis of the V-λ data stored in the storage unit.

Next, operations of the gas detector 100 as mentioned above will be described below.

The sensor chip detector 148 is provided inside the sensor cover 131 located at the upper portion of the main body 130, and the presence or absence of the sensor chip 110 is detected by the sensor chip detector 148. When a detection signal from the sensor chip detector 148 is detected, the signal processing unit 144 determines that the sensor chip 110 is mounted, and emits a display signal for displaying an executable detection operation on the display unit 141.

When the operation panel 140 is operated by, for example, a user, and an instruction signal for starting a detection process is output from the operation panel 140 to the signal processing unit 144, first, the signal processing unit 144 causes the light source driver circuit 145 to operate the light source 135A by outputting a light source operation signal. When the light source 135A is driven, stable laser light of linearly polarized light having a single wavelength is emitted from the light source 135A. In addition, the light source 135A has a temperature sensor or a light amount sensor built-in, and its information is output to the signal processing unit 144. When it is determined that the light source 135A is stably operated on the basis of the temperature or the amount of light which is input from the light source 135A, the signal processing unit 144 controls the exhaust driver circuit 150 and brings the exhaust unit 133 into operation. Thereby, a gaseous sample including a target substance (gas molecules) to be detected is induced from the suction port 120A to the suction flow channel 120B, the inside of the sensor chip 110, the exhaust flow channel 120C, and the exhaust port 120D. Meanwhile, the suction port 120A is provided with a dust filter 120A1, relatively large dust particles, some vapor and the like are removed.

In addition, the sensor chip 110 is a sensor, having a plurality of metal nanostructures built-in, in which localized surface plasmon resonance is used. In such a sensor chip 110, an enhanced electric field is formed between metal nanostructures by laser light, and gas molecules gain entrance into the enhanced electric field, Raman scattering light including information of a molecular vibration and Rayleigh scattering light are generated.

The Rayleigh scattering light and the Raman scattering light are incident on the filter 136 through the optical portion 135, the Rayleigh scattering light is split by the filter 136, and the Raman scattering light is incident on the wavelength variable interference filter 5. The signal processing unit 144 outputs a control signal to the voltage control unit 146. Thereby, as shown in the above-mentioned first embodiment, the voltage control unit 146 reads a voltage value corresponding to the wavelength to be measured from the storage unit, applies the voltage to the electrostatic actuator 56 of the wavelength variable interference filter 5, and spectroscopically disperses the Raman scattering light corresponding to gas molecules to be detected using the wavelength variable interference filter 5. Thereafter, when the spectroscopically dispersed light is received in the light receiving element 137, a light receiving signal according to the amount of light received is output to the signal processing unit 144 through the light receiving circuit 147. In this case, it is possible to accurately extract the targeted Raman scattering light from the wavelength variable interference filter 5.

The signal processing unit 144 compares spectrum data of the Raman scattering light corresponding to the gas molecules to be detected which are obtained as mentioned above with data stored in a ROM, determines whether the targeted gas molecules are present, and specifies the substances. In addition, the signal processing unit 144 causes the display unit 141 to display result information thereof, or outputs the result information from the connection portion 142 to the outside.

Meanwhile, in FIGS. 9 and 10, the gas detector 100 is illustrated in which the Raman scattering light is spectroscopically dispersed by the wavelength variable interference filter 5 and a gas is detected from the spectroscopically dispersed Raman scattering light, but the gas detector may be used as a gas detector that specifies a gas type by detecting absorbance inherent in a gas. In this case, a gas sensor that causes a gas to flow into a sensor and detects light absorbed by a gas in the incident light is used as the optical module according to the invention. A gas detector that analyzes and discriminates the gas flowing into the sensor using such a gas sensor is used as the electronic device according to the invention. In such a configuration, it is also possible to detect gas components using the wavelength variable interference filter.

In addition, as a system for detecting the presence of a specific substance, a substance component analyzer such as a noninvasive measurement device of saccharide using near-infrared spectroscopy, or a noninvasive measurement device of information such as food, a living body, and a mineral can be used without being limited to the gas detection as mentioned above.

Hereinafter, a food analyzer will be described as an example of the above-mentioned substance component analyzer.

Figure 11:
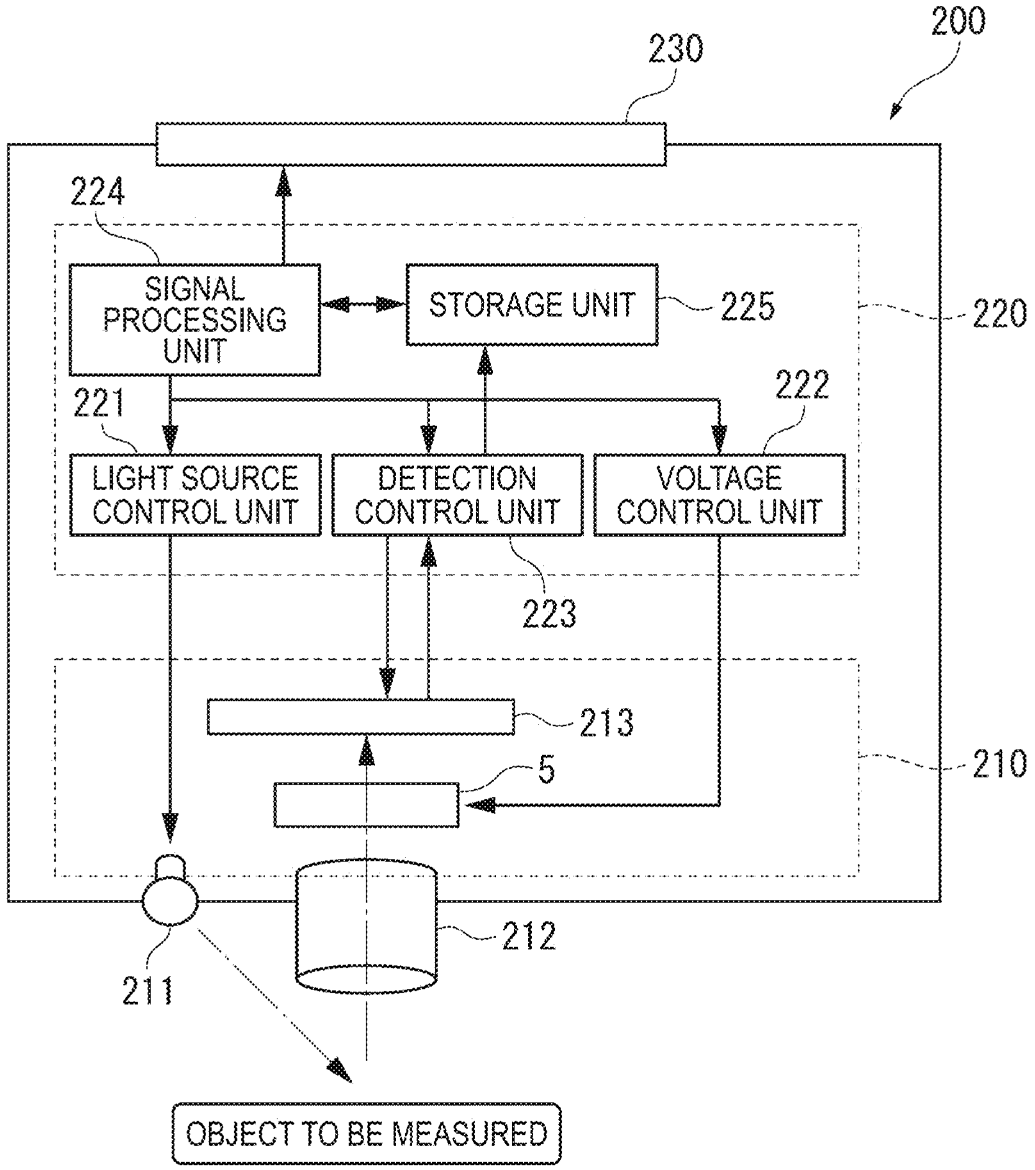
FIG. 11 is a diagram illustrating a schematic configuration of a food analyzer which is an example of an electronic device of the invention.

FIG. 11 is a diagram illustrating a schematic configuration of a food analyzer which is an example of the electronic device using the wavelength variable interference filter 5.

As shown in FIG. 11, a food analyzer 200 includes a detector 210 (optical module), a control unit 220, and a display unit 230. The detector 210 includes a light source 211 that emits light, an imaging lens 212 into which light from an object to be measured is introduced, the wavelength variable interference filter 5 that spectroscopically disperses light introduced from the imaging lens 212, and an imaging unit 213 (detection unit) that detects spectroscopically dispersed light.

In addition, the control unit 220 includes a light source control unit 221 that performs turn-on and turn-off control of the light source 211 and brightness control at the time of turn-on, a voltage control unit 222 that controls the wavelength variable interference filter 5, a detection control unit 223 that controls the imaging unit 213 and acquires a spectroscopic image which is imaged by the imaging unit 213, a signal processing unit 224 (processing control unit), and a storage unit 225. Meanwhile, the gap control unit according to the invention is constituted by the voltage control unit 222 and the storage unit 225.

The food analyzer 200 is configured such that when the system is driven, the light source 211 is controlled by the light source control unit 221, and light is applied from the light source 211 to an object to be measured. Light reflected from the object to be measured is incident on the wavelength variable interference filter 5 through the imaging lens 212. The wavelength variable interference filter 5 is controlled by the voltage control unit 222, and the wavelength variable interference filter 5 is driven by the driving method as shown in the first embodiment or the second embodiment mentioned above. Thereby, it is possible to accurately extract light having a target wavelength from the wavelength variable interference filter 5. The extracted light is imaged by the imaging unit 213 which is constituted by, for example, a CCD camera and the like. In addition, the imaged light is accumulated in the storage unit 225 as a spectroscopic image. In addition, the signal processing unit 224 changes a voltage value applied to the wavelength variable interference filter 5 by controlling the voltage control unit 222, and acquires a spectroscopic image for each wavelength.

The signal processing unit 224 arithmetically processes data of each pixel in each image accumulated in the storage unit 225, and obtains a spectrum in each pixel. In addition, for example, information on components of food regarding the spectrum is stored in the storage unit 225. The signal processing unit 224 analyzes data of the obtained spectrum on the basis of the information on the food stored in the storage unit 225, and obtains food components included in the object to be detected and the content thereof. In addition, food calorie, freshness and the like can be calculated from the obtained food components and content. Further, by analyzing a spectral distribution within the image, it is possible to extract a portion in which freshness deteriorates in food to be tested, and to detect foreign substances or the like included in the food.

The signal processing unit 224 performs a process of displaying information such as the components, the content, calorie, freshness and the like of the food to be tested which are obtained as mentioned above, on the display unit 230.

In addition, in FIG. 11, an example of the food analyzer 200 is illustrated, but the food analyzer can also be used as the above-mentioned noninvasive measurement device of other information using substantially the same configuration. For example, the food analyzer can be used as a living body analyzer that analyzes living body components, for example, measures and analyzes body fluid components such as blood. Such a living body analyzer is used as a device that measures, for example, body fluid components such as blood. When the analyzer is used as a device that detects ethyl alcohol, the analyzer can be used as an anti-drunk-driving device that detects the drinking condition of a driver. In addition, the analyzer can also be used as an electronic endoscope system including such a living body analyzer.

Further, the analyzer can also be used as a mineral analyzer that performs a component analysis of a mineral.

Further, the optical module and the electronic device according to the invention can be applied to the following devices.

For example, it is also possible to transmit data using the light of each wavelength by temporally changing the intensity of the light of each wavelength. In this case, light of a specific wavelength is spectroscopically dispersed by the wavelength variable interference filter provided in the optical module, and is received in the light receiving unit, thereby allowing data transmitted by the light of a specific wavelength to be extracted. The data of the light of each wavelength is processed by the electronic device including such an optical module for data extraction, and thus it is also possible to perform optical communication.

In addition, the electronic device can also be applied to a spectroscopic camera, a spectroscopic analyzer and the like that image a spectroscopic image by spectroscopically dispersing light using the wavelength variable interference filter. An example of such a spectroscopic camera includes an infrared camera having a wavelength variable interference filter built-in.

Figure 12:
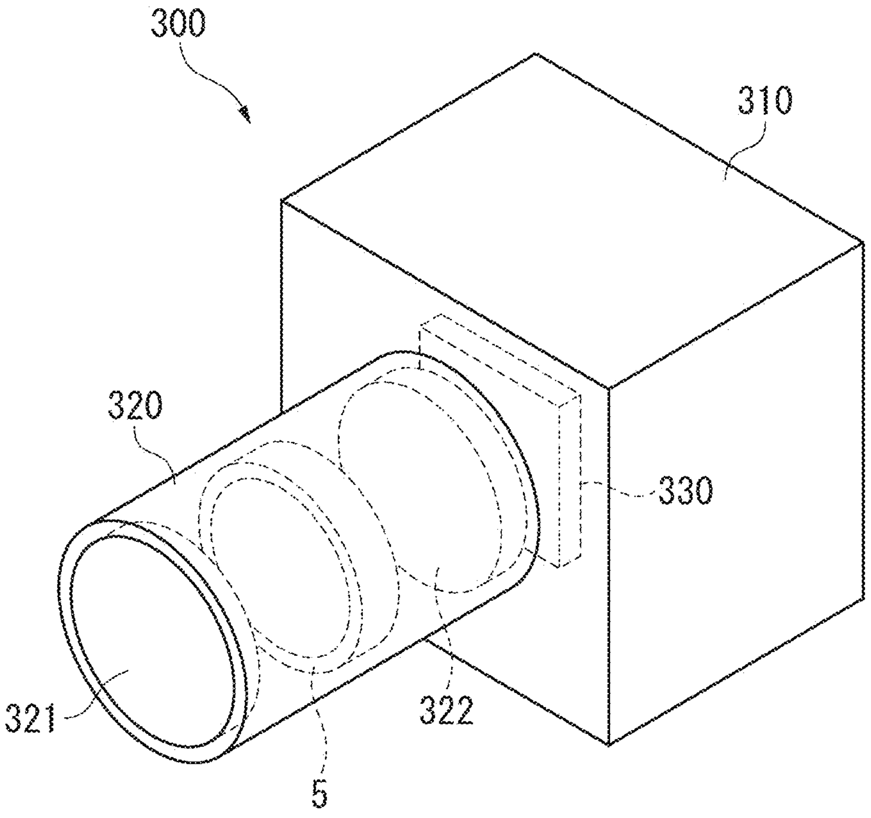
FIG. 12 is a diagram illustrating a schematic configuration of a spectroscopic camera which is an example of an electronic device of the invention.

FIG. 12 is a schematic diagram illustrating a schematic configuration of a spectroscopic camera. As shown in FIG. 12, a spectroscopic camera 300 includes a camera body 310, an imaging lens unit 320, and an imaging unit 330 (detection unit).

The camera body 310 is a portion which is held and operated by a user.

The imaging lens unit 320 is provided in the camera body 310, and guides incident image light to the imaging unit 330. In addition, as shown in FIG. 12, the imaging lens unit 320 includes an objective lens 321, an imaging lens 322, and the wavelength variable interference filter 5 provided between these lenses.

The imaging unit 330 is constituted by a light receiving element, and images image light guided by the imaging lens unit 320.

In such a spectroscopic camera 300, it is possible to image a spectroscopic image of light having a desired wavelength by transmitting light of a wavelength serving as an imaging object using the wavelength variable interference filter 5. At this time, a gap control unit (not shown) drives the wavelength variable interference filter 5 with respect to each wavelength by the driving method according to the invention as shown in the above-mentioned first embodiment, and thus it is possible to accurately extract image light of a spectroscopic image of a target wavelength.

Further, the wavelength variable interference filter may be used as a band pass filter, and may be used, as for example, an optical laser device in which only narrow-band light centered on a predetermined wavelength in light of a predetermined wavelength region which is emitted by the light-emitting element is spectroscopically dispersed and transmitted using the wavelength variable interference filter.

In addition, the wavelength variable interference filter may be used as a living body authentication device, and may also be applied to, for example, an authentication device of a blood vessel, a fingerprint, a retina, an iris and the like using light of a near-infrared region or a visible region.

Further, the optical module and the electronic device can be used as a concentration detector. In this case, infrared energy (infrared light) emitted from a substance is spectroscopically dispersed and analyzed by the wavelength variable interference filter, and the concentration of a test object in a sample is measured.

As mentioned above, the optical module and the electronic device according to the invention can also be applied to any device that spectroscopically disperses predetermined light from incident light. As mentioned above, since the wavelength variable interference filter can spectroscopically disperse multiple wavelengths using one device, it is possible to accurately perform the measurement of a spectrum of multiple wavelengths, and the detection of a plurality of components. Therefore, as compared to a device of the related art that extracts a desired wavelength using a plurality of devices, the optical module and the electronic device can be facilitated to be reduced in size, and can be suitably used as, for example, a portable or in-car optical device.

Besides, a specific structure at the time of carrying out the invention can be appropriately changed to other structures in a range capable of achieving an object of the invention.

What is claimed is:

1. An optical module comprising:

a first reflective film that transmits a first portion of incident light and reflects a second portion of the incident light;

a second reflective film, disposed so as to face the first reflective film, that reflects a third portion of the incident light and transmits a fourth portion of the incident light; and a gap controller that changes a size of a gap between the first reflective film and the second reflective film, wherein the gap controller controls the size of the gap in correspondence with a wavelength to be measured based on an order of a transmission spectrum which is set with respect to each of two or more wavelength region groups constituting a wavelength region to be measured, wherein a measurement wavelength region includes a first wavelength region and a second wavelength region having a longer wavelength than that of the first wavelength region, the wavelength to be measured includes a lower-order peak wavelength and a higher-order peak wavelength, and the wavelength to be measured is transmitted using the higher-order peak wavelength to thereby enable the gap between the reflective films to be increased in comparison to where the wavelength to be measured is transmitted using the lower-order peak wavelength, wherein m and n are different natural numbers, and m=n+1, wherein light of the wavelength to be measured in the first wavelength region is transmitted using an m-th peak wavelength as the higher-order peak wavelength, and light of a wavelength to be measured in the second wavelength region is transmitted using an n-th peak wavelength as the lower-order peak wavelength, wherein the gap controller controls the size of the gap using an m-th peak wavelength for light of the first wavelength region, and controls the size of the gap using an n-th peak wavelength for light of the second wavelength region, and wherein the gap for extracting light having a shortest wavelength in the second wavelength region is larger than the gap for extracting light having a longest wavelength in the first wavelength region.

2. The optical module according to claim 1, wherein the gap controller controls the size of the gap using the m-th peak for the shortest wavelength belonging to the first wavelength region, and controls the size of the gap using the n-th peak for the second wavelength region.

3. The optical module according to claim 2, wherein the gap controller selects the m-th order for the shortest wavelength belonging to the first wavelength region, and selects the n-th order for the second wavelength region.

4. The optical module according to claim 3, wherein the gap controller acquires the gap with respect to each of a plurality of the wavelengths to be measured included in the measurement wavelength region, and performs a sequential change to the acquired gap from a maximum value of the gap in a direction in which the gap is reduced.

5. The optical module according to claim 2, further comprising a electrostatic actuator that changes the size of the gap by applying a voltage, wherein the gap controller includes a storage unit that stores V-λ data in which a voltage applied to the electrostatic actuator with respect to a wavelength to be measured is recorded for each wavelength to be measured, the V-λ data is data in which the wavelength to be measured is associated with a voltage corresponding to the gap for extracting light of the wavelength to be measured as a peak wavelength of the set order, and the gap controller applies the voltage, corresponding to the wavelength to be measured, from the V-λ data to the electrostatic actuator.

6. The optical module according to claim 2, further comprising a electrostatic actuator that changes the size of the gap by applying a voltage, wherein the gap controller includes a storage unit that stores V-λ data in which a voltage applied to the electrostatic actuator with respect to a wavelength to be measured is recorded for each wavelength to be measured, the V-λ data indicates a relationship between the wavelength to be measured and a voltage corresponding to the gap for extracting light of the wavelength to be measured as a peak wavelength of each order, and the gap controller selects an order corresponding to the wavelength to be measured, and applies the voltage corresponding to the selected order to the electrostatic actuator.

7. The optical module according to claim 1, further comprising a electrostatic actuator that changes the size of the gap by applying a voltage, wherein the gap controller includes a storage unit that stores V-λ data in which a voltage applied to the electrostatic actuator with respect to a wavelength to be measured is recorded for each wavelength to be measured, the V-λ data is data in which the wavelength to be measured is associated with a voltage corresponding to the gap for extracting light of the wavelength to be measured as a peak wavelength of the set order, and the gap controller applies the voltage, corresponding to the wavelength to be measured, from the V-Δ data to the electrostatic actuator.

8. The optical module according to claim 1, further comprising a electrostatic actuator that changes the size of the gap by applying a voltage, wherein the gap controller includes a storage unit that stores V-λ data in which a voltage applied to the electrostatic actuator with respect to a wavelength to be measured is recorded for each wavelength to be measured, the V-λ data indicates a relationship between the wavelength to be measured and a voltage corresponding to the gap for extracting light of the wavelength to be measured as a peak wavelength of each order, and the gap controller selects an order corresponding to the wavelength to be measured, and applies the voltage corresponding to the selected order to the electrostatic actuator.

9. An electronic device comprising:

the optical module according to claim 1; and a signal processor that performs a predetermined process based on light extracted by the first reflective film and the second reflective film, and a detection unit that detects the light extracted by the first reflective film and the second reflective film.

10. The electronic device according to claim 9, wherein the signal processor causes a transformation matrix for transforming a measurement spectrum into an optical spectrum to act on the measurement spectrum based on the amount of light of each wavelength to be measured which is detected by the detection unit, and estimates an optical spectrum of measurement light incident on the first reflective film and the second reflective film.

* * * * *